US012591832B2

(12) United States Patent
R et al.

(10) Patent No.: US 12,591,832 B2
(45) Date of Patent: Mar. 31, 2026

(54) SYSTEM AND METHOD OF COGNITIVE RISK MANAGEMENT

(71) Applicant: Blue Yonder Group, Inc., Scottsdale, AZ (US)

(72) Inventors: Devanand R, Bangalore (IN); Narayan Nandeda, Ujjain (IN); Tushar Shekhar, Bangalore (IN); Vidhi Chugh, Bangalore (IN); Manish Kumar, Bangalore (IN); Deb Mohanty, Bangalore (IN)

(73) Assignee: Blue Yonder Group, Inc., Scottsdale, AZ (US)

( * ) Notice: Subject to any disclaimer, the term of this patent is extended or adjusted under 35 U.S.C. 154(b) by 67 days.

(21) Appl. No.: 18/921,674

(22) Filed: Oct. 21, 2024

(65) Prior Publication Data

US 2025/0045669 A1    Feb. 6, 2025

Related U.S. Application Data

(63) Continuation of application No. 17/166,555, filed on Feb. 3, 2021, now Pat. No. 12,147,925.

(60) Provisional application No. 62/969,785, filed on Feb. 4, 2020, provisional application No. 62/970,050, filed on Feb. 4, 2020, provisional application No. 62/969,603, filed on Feb. 3, 2020.

(51) Int. Cl.
| | |
|---|---|
| *G06Q 10/00* | (2026.01) |
| *G06N 7/00* | (2023.01) |
| *G06N 7/01* | (2023.01) |
| *G06N 20/00* | (2019.01) |
| *G06Q 10/0635* | (2023.01) |
| *G06Q 10/0639* | (2023.01) |
| *G06Q 10/087* | (2023.01) |

(52) U.S. Cl.
CPC ........... *G06Q 10/0635* (2013.01); *G06N 7/01* (2023.01); *G06N 20/00* (2019.01); *G06Q 10/06393* (2013.01); *G06Q 10/087* (2013.01)

(58) Field of Classification Search
CPC ........... G06Q 10/00; G06N 20/00; G06N 7/00
USPC ........................................................ 705/7.28
See application file for complete search history.

(56) References Cited

U.S. PATENT DOCUMENTS

| | | | |
|---|---|---|---|
| 8,140,454 | B2 | 3/2012 | Bullen et al. |
| 9,978,026 | B1 | 5/2018 | Konanur et al. |
| 10,656,835 | B2 | 5/2020 | Auvenshine et al. |
| 10,990,891 | B1 | 4/2021 | Atay |
| 11,087,229 | B2 | 8/2021 | Khidekel et al. |
| 11,620,612 | B2 | 4/2023 | Ohlsson et al. |

(Continued)

*Primary Examiner* — Mustafa Iqbal
(74) *Attorney, Agent, or Firm* — Spencer Fane LLP; Steven J. Laureanti

(57) ABSTRACT

A system and method for a risk management visualization system having a computer comprising a processor and memory and configured to model a supply chain network as a supply chain planning problem, one or more key process indicators (KPIs) of the supply chain planning problem is based, at least in part, on the one or more input variables, model an impact on the one or more KPIs from each of the one or more input variables at a selected confidence interval using a Bayesian optimization process comprising an exploration phase and a learning phase, and display a visualization of the risk profile for the one or more KPIs, the visualization indicating a probability that an actual KPI value differs from a predicted KPI value.

20 Claims, 20 Drawing Sheets

(56)　　　　　　References Cited

U.S. PATENT DOCUMENTS

| | | | |
|---|---|---|---|
| 2004/0199445 A1 | 10/2004 | Eder | |
| 2009/0187651 A1* | 7/2009 | Schuckenbrock | G06Q 10/06 709/224 |
| 2016/0187874 A1* | 6/2016 | Chen | G06Q 50/04 700/96 |
| 2020/0175630 A1 | 6/2020 | Bajaj et al. | |
| 2020/0202277 A1* | 6/2020 | Zhu | G06Q 10/06395 |
| 2021/0216928 A1* | 7/2021 | O'Toole | G06F 16/29 |

* cited by examiner

602a

602b

FROM

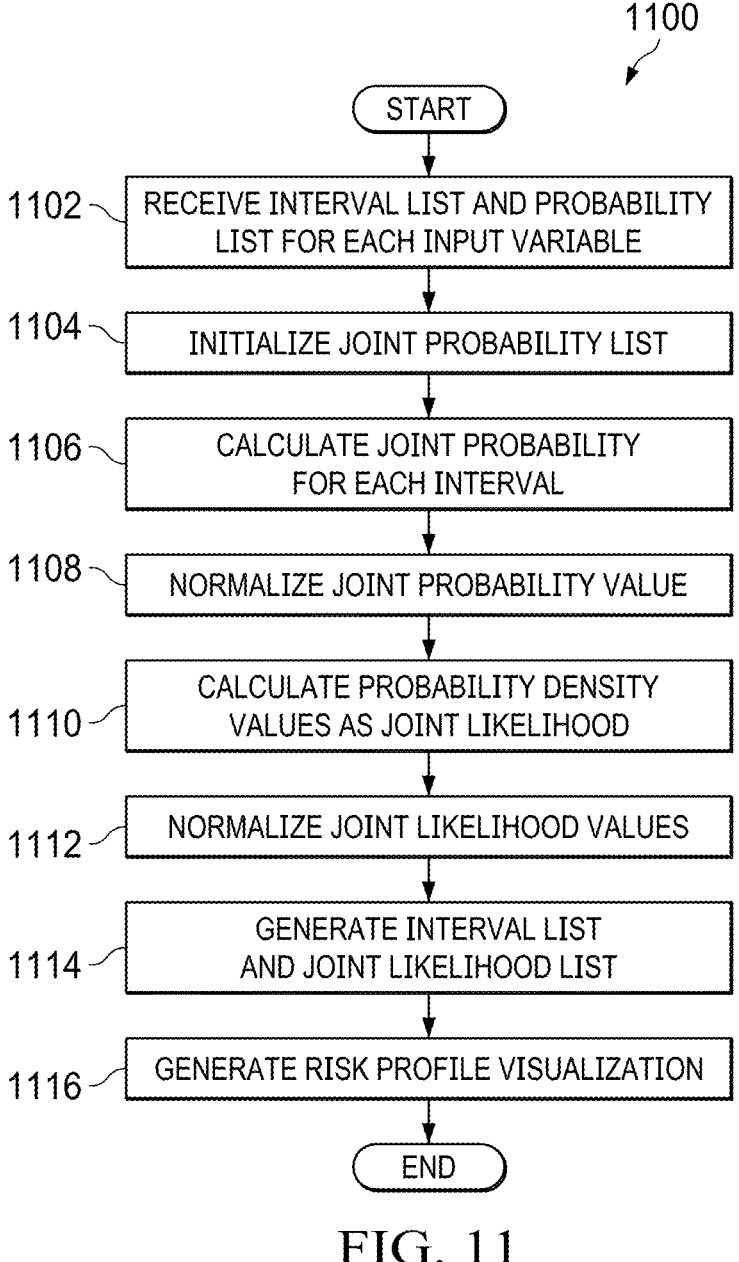

1100

START

1102 — RECEIVE INTERVAL LIST AND PROBABILITY LIST FOR EACH INPUT VARIABLE

1104 — INITIALIZE JOINT PROBABILITY LIST

1106 — CALCULATE JOINT PROBABILITY FOR EACH INTERVAL

1108 — NORMALIZE JOINT PROBABILITY VALUE

1110 — CALCULATE PROBABILITY DENSITY VALUES AS JOINT LIKELIHOOD

1112 — NORMALIZE JOINT LIKELIHOOD VALUES

1114 — GENERATE INTERVAL LIST AND JOINT LIKELIHOOD LIST

1116 — GENERATE RISK PROFILE VISUALIZATION

END

FIG. 11

FIG. 14          1402
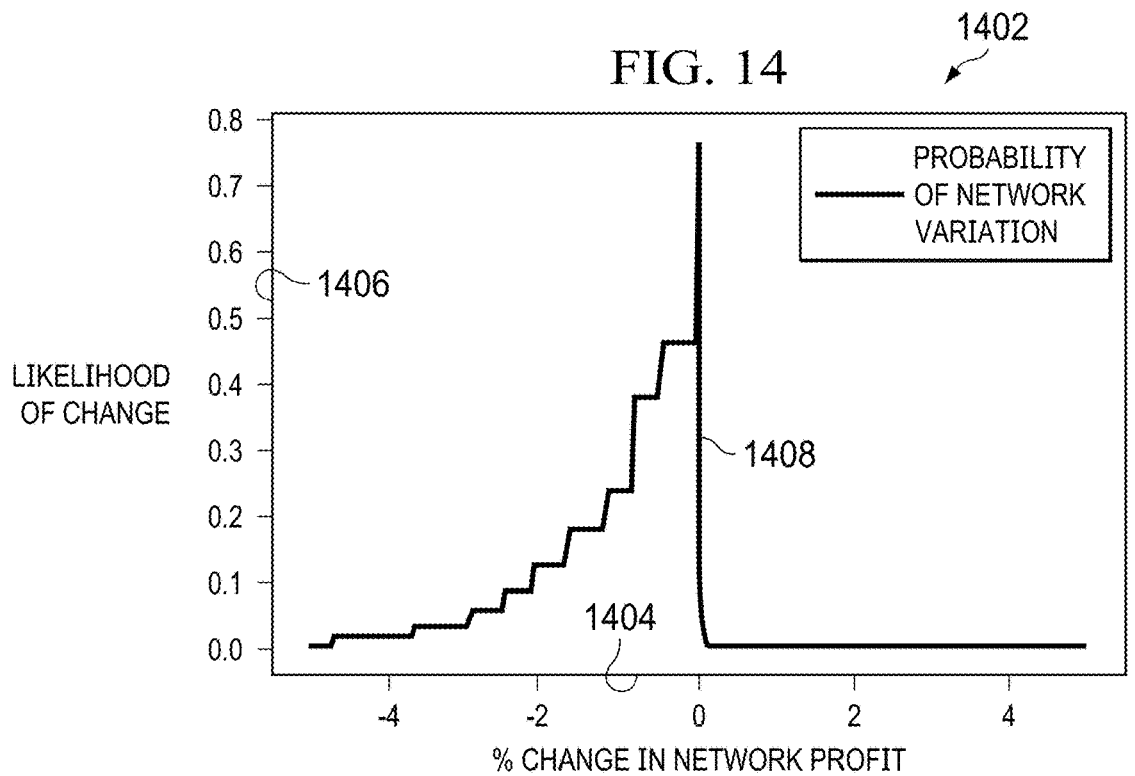
FIG. 15
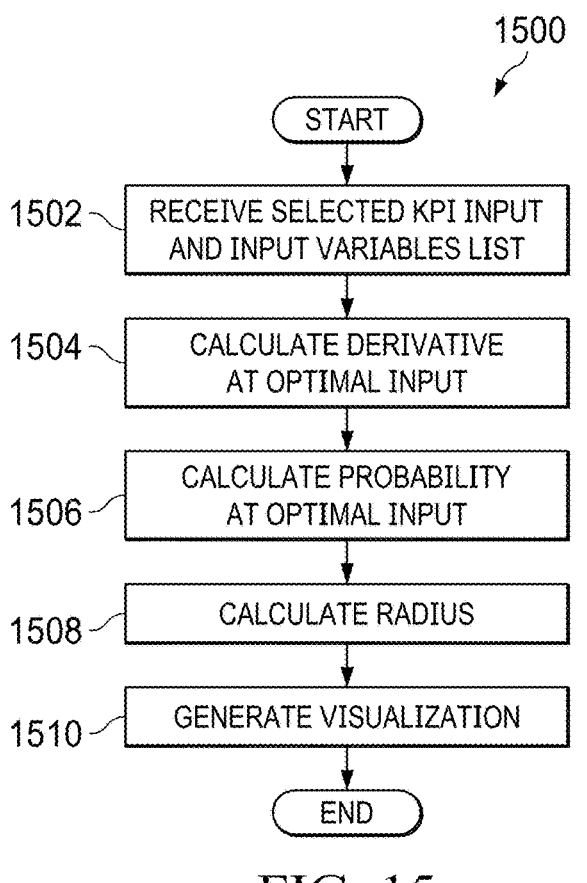

1600

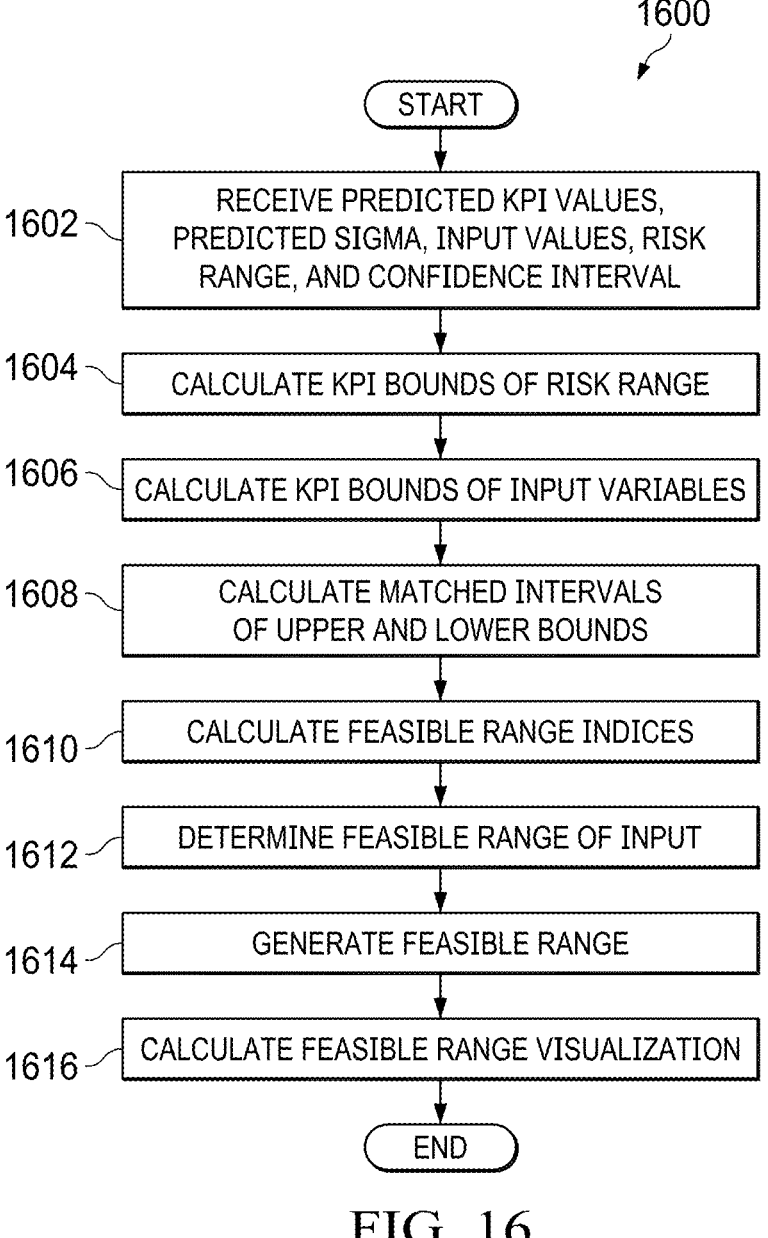

START

1602 — RECEIVE PREDICTED KPI VALUES, PREDICTED SIGMA, INPUT VALUES, RISK RANGE, AND CONFIDENCE INTERVAL

1604 — CALCULATE KPI BOUNDS OF RISK RANGE

1606 — CALCULATE KPI BOUNDS OF INPUT VARIABLES

1608 — CALCULATE MATCHED INTERVALS OF UPPER AND LOWER BOUNDS

1610 — CALCULATE FEASIBLE RANGE INDICES

1612 — DETERMINE FEASIBLE RANGE OF INPUT

1614 — GENERATE FEASIBLE RANGE

1616 — CALCULATE FEASIBLE RANGE VISUALIZATION

END

FIG. 16

SYSTEM AND METHOD OF COGNITIVE RISK MANAGEMENT

CROSS-REFERENCE TO RELATED APPLICATIONS

This application is a continuation of U.S. patent application Ser. No. 17/166,555, filed Feb. 3, 2021, entitled "System and Method of Cognitive Risk Management," which claims the benefit under 35 U.S.C. § 119 (e) to U.S. Provisional Application No. 62/969,603, filed Feb. 3, 2020, entitled "System and Method of Cognitive Risk Management," U.S. Provisional Application No. 62/969,785, filed Feb. 4, 2020, entitled "System and Method of Cognitive Risk Management Visualization," and U.S. Provisional Application No. 62/970,050, filed Feb. 4, 2020, entitled "System and Method of Cognitive Risk Management." U.S. patent application Ser. No. 17/166,555 and U.S. Provisional Application Nos. 62/969,603, 62/969,785, and 62/970,050 are assigned to the assignee of the present application.

TECHNICAL FIELD

The present disclosure relates generally to supply chain planning and specifically to visualization and management of risk due to input variability.

BACKGROUND

During supply chain planning, a supply chain plan may be generated that maximizes or minimizes a business objective given the value or a range of values for one or more of the input variables. When the business objective is maximizing or minimizing the value of a key process indicator (KPI), the solution provides the optimal KPI for the given values for selected input variables. To help in determining risk in supply chain planning, the system is often unable to present a large amount of data and further is unable to present this data with regard to individual tolerances for risk. These drawbacks are undesirable.

BRIEF DESCRIPTION OF THE DRAWINGS

A more complete understanding of the present invention may be derived by referring to the detailed description when considered in connection with the following illustrative figures. In the figures, like reference numbers refer to like elements or acts throughout the figures.

FIG. 11 illustrates generating a risk profile visualization, according to an embodiment;

FIG. 14 illustrates a risk profile graph, according to an embodiment;

FIG. 15 illustrates a method of generating a degree of influence visualization, according to an embodiment;

FIG. 16 illustrates a method for calculating a feasible input range, according to an embodiment;

DETAILED DESCRIPTION

Figure 1:
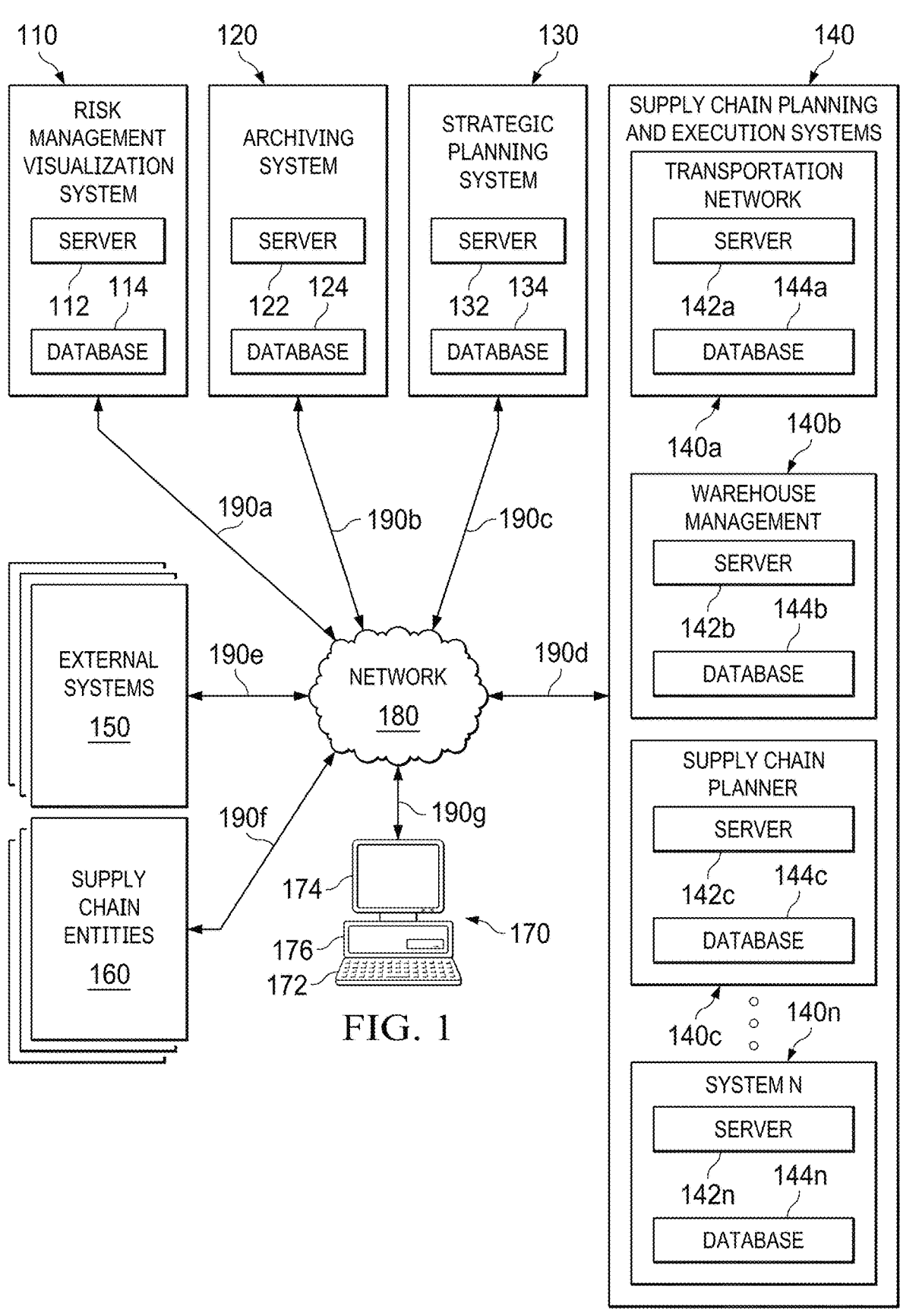
FIG. 1 illustrates a supply chain network, according to a first embodiment.

Aspects and applications of the invention presented herein are described below in the drawings and detailed description of the invention. Unless specifically noted, it is intended that the words and phrases in the specification and the claims be given their plain, ordinary, and accustomed meaning to those of ordinary skill in the applicable arts.

In the following description, and for the purposes of explanation, numerous specific details are set forth in order to provide a thorough understanding of the various aspects of the invention. It will be understood, however, by those skilled in the relevant arts, that the present invention may be practiced without these specific details. In other instances, known structures and devices are shown or discussed more generally in order to avoid obscuring the invention. In many cases, a description of the operation is sufficient to enable one to implement the various forms of the invention, particularly when the operation is to be implemented in software. It should be noted that there are many different and alternative configurations, devices and technologies to which the disclosed inventions may be applied. The full scope of the inventions is not limited to the examples that are described below.

FIG. 1 illustrates supply chain network 100, according to a first embodiment. Supply chain network 100 comprises risk management visualization system 110, archiving system 120, strategic planning system 130, one or more planning and execution systems 140, one or more external systems 150, one or more supply chain entities 160, one or more computers 170, network 180, and one or more communication links 190a-190g. Although a single risk management visualization system 110, a single archiving system 120, a single strategic planning system 130, one or more planning and execution systems 140, one or more external systems 150, one or more supply chain entities 160, one or more computers 170, and a single network 170 are shown and described, embodiments contemplate any number of risk management visualization systems, archiving systems, strategic planning systems, supply chain planning and execution systems, external systems, supply chain entities, computers, or networks, according to particular needs.

In one embodiment, risk management visualization system 110 comprises server 112 and database 114. Server 112 comprises one or more modules that generate a risk profile for predicted Key Process Indicators (KPIs) of a supply chain plan based, at least in part, on the uncertainty of one or more input variables and a user-selectable amount of acceptable risk. Risk management visualization system 110 comprises a graphical user interface (GUI) that displays visualizations of the risk profile for at least one KPI while also providing interactive visual elements that provide for user selection or adjustment of input variable values and an acceptable risk range. In response to one or more selections or adjustments, risk management visualization system 110 may recalculate and display an updated risk profile, which may include visualizations showing whether the selections or adjustments resulted in reducing or increasing the risk. As described in further detail below, embodiments of risk management visualization system 110 comprise a tool to identify the inputs having the greatest influence on one or more KPIs and sort these inputs according to the degree of their influence, variability, and risk likelihood. In one embodiment, risk management visualization system 110 calculates, for the input variables, an optimal value that maximizes or minimizes the KPI as well as a range of feasible values that fall within an acceptable risk range.

Archiving system 120 of supply chain network 100 comprises server 122 and database 124. Although archiving system 120 is shown as comprising a single server 122 and a single database 124, embodiments contemplate any suitable number of servers or databases internal to, or externally coupled with, archiving system 120. Server 122 of archiving system 120 supports one or more processes for receiving and storing data from strategic planning system 130, one or more planning and execution systems 140, one or more external systems 150, one or more supply chain entities 160, and/or one or more computers 170 of supply chain network 100. According to some embodiments, archiving system 120 provides archived data to risk management visualization system 110, strategic planning system 130, and one or more planning and execution systems 140 to, for example, model and calculate the input variability, create machine learning models of the KPI response to the input variability using a Bayesian optimization process, and generate plans or solutions having a user-adjustable amount of risk. Server 122 may store the received data in database 124. Database 124 of archiving system 120 may comprise one or more databases or other data storage arrangement at one or more locations, local to, or remote from, server 122.

Strategic planning system 130 of supply chain network 100 comprises server 132 and database 134. Server 132 of strategic planning system 130 provides for modeling and planning supply chain networks, what-if scenarios, and solving supply chain planning problems to analyze, optimize, and design supply chain network 100. In one embodiment, strategic planning system 130 aligns one or more planning and execution systems 140 to a supply chain plan to improve, for example, profit, service level, revenue, growth, and the like while respecting costs, constraints, and business objectives. As described in further detail below, strategic planning system 130 models supply chain planning problems, supply chain networks, what-if scenarios as mathematical formulations. In addition, or as an alternative, strategic planning system 130 solves one or more models of supply chain planning problems, supply chain networks, what-if scenarios as mathematical formulations to generate a solution.

In one embodiment, a solution comprises the maximum or minimum value of a business objective given the value (or a range of values) for one or more input variables. When the business objective is maximizing or minimizing the value of a KPI, the solution provides the optimal KPI for the given values for selected input variables. One or more solvers 264 (FIG. 2) process complex supply chain planning problems and models wherein a correlation between input and output is non-trivial. As described in further detail below, risk management visualization system 110 provides a dynamic dashboard that visualizes the risk and probabilistic nature of inputs and predictions of global optimizers for plans with these complex constraints. As described in further detail below, risk management dashboard 900 (FIGS. 9A-9B) provides for determining, among other things, the predicted value of the KPI, the likelihood that a KPI value dips by a particular value or percentage, the range of input values that are expected to give a KPI value within an acceptable level of risk, and the most likely value of a KPI for a particular confidence level. Although examples of risk management visualization system 110 disclosed herein are given in connection with strategic planning system 130, embodiments contemplate risk management visualization system 110 operably coupled with any one or more planning and execution systems 140 of supply chain network 100, according to particular needs.

One or more planning and execution systems 140 of supply chain network 100 comprise transportation network 140a, warehouse management system 140b, supply chain planner 140c, and any other planning and execution system 140n. Although one or more planning and execution systems 140 are shown and described as comprising a single transportation network 140a, a single warehouse management system 140b, a single supply chain planner 140c, and a single other planning and execution system 140n, embodiments contemplate any number or combination of one or more planning and execution systems 140 located internal to, or remote from, supply chain network 100, according to particular needs. For example, planning and execution systems 140 typically perform several distinct and dissimilar processes, including, for example, assortment planning, demand planning, operations planning, production planning, supply planning, distribution planning, execution, forecasting, transportation management, warehouse management, inventory management, fulfilment, procurement, and the like. Server 142 of one or more planning and execution systems 140 comprises one or more modules, such as, for example, a planning module, a solver, a modeler, and/or an engine, for performing activities of one or more planning and execution processes. Server 142 stores and retrieves data from database 144 or from one or more locations in supply chain network 100. In addition, one or more planning and execution systems 140 operate on one or more computers 170 that are integral to, or separate from, the hardware and/or software that support risk management visualization system 110, archiving system 120, strategic planning system 130, one or more external systems 150, or one or more supply chain entities 160.

By way of example only and not by way of limitation, one or more planning and execution systems 140 include transportation network 140a. Transportation network 140a comprises server 142a and database 144a. According to embodiments, transportation network 140a directs one or more transportation vehicles to ship one or more items between one or more supply chain entities 160, based, at least in part, on a supply chain plan, including a supply chain master plan, the number of items currently in stock at one or more supply chain entities 160 or other stocking location, the number of items currently in transit in transportation network 140a, a forecasted demand, a supply chain disruption, and/or one or more other factors described herein. One or more transportation vehicles comprise, for example, any number of trucks, cars, vans, boats, airplanes, unmanned aerial vehicles (UAVs), cranes, robotic machinery, or the like. The one or more transportation vehicles may comprise radio, satellite, or other communication that communicates location information (such as, for example, geographic coordinates, distance from a location, global positioning satellite (GPS) information, or the like) with risk management visualization system 110, archiving system 120, strategic planning system 130, one or more planning and execution systems 140, one or more external systems 150, and/or one or more supply chain entities 160 to identify the location of the one or more transportation vehicles and the location of any inventory or shipment located on the one or more transportation vehicles.

By way of a further example only and not by way of limitation, one or more planning and execution systems 140 include warehouse management system 140b. Server 142b stores and retrieves item data from database 144b or from one or more locations in supply chain network 100. According to embodiments, server 142b comprises one or more modules that manage and operate warehouse operations, plan timing and identity of shipments, generate picklists, packing plans, and instructions. Warehouse management system 140b instructs users and/or automated machinery to obtain picked items and generates instructions to guide placement of items on a picklist in the configuration and layout determined by a packing plan. For example, the instructions may instruct a user and/or automated machinery to prepare items on a picklist for shipment by obtaining the items from inventory or a staging area and packing the items on a pallet in a proper configuration for shipment. Embodiments contemplate warehouse management system 140b determining routing, packing, or placement of any item, package, or container into any packing area, including, packing any item, package, or container in another item, package, or container. Warehouse management system 140b may generate instructions for packing products into boxes, packing boxes onto pallets, packing loaded pallets into trucks, or placing any item, container, or package in a packing area, such as, for example, a box, a pallet, a shipping container, a transportation vehicle, a shelf, a designated location in a warehouse (such as a staging area), and the like. Although one or more planning and execution systems 140 are shown and described as comprising warehouse management system 140b, embodiments contemplate one or more planning and execution systems 140 including or working in connection with an inventory system. A server of the inventory system is configured to receive and transmit item data, including item identifiers, pricing data, attribute data, inventory levels, and other like data about one or more items at one or more stocking locations in supply chain network 100.

As disclosed above, one or more planning and execution systems 140 may include supply chain planner 140c. Server 142c stores and retrieves item data from database 144c or from one or more locations in supply chain network 100. According to embodiments, supply chain planner 140c solves supply chain planning problems (such as, for example, operation planning problems) and generates a solution to a supply chain planning problem, wherein the solution comprises the maximum or minimum value of a KPI (for maximization KPIs, such as, for example, network profit and for minimization KPIs, such as, for example, cost). Planning and execution systems 140 may transmit solution output to risk management visualization system 110, which calculates and visualizes a risk profile based on the received data.

One or more external systems 150 comprise server 152 and database 154. One or more external systems 150 may comprise a repository or interface that provides for example, weather data, special events data, social media data, calendars, and the like and stores the received data in database 154.

As shown in FIG. 1, supply chain network 100 comprising risk management visualization system 110, archiving system 120, strategic planning system 130, one or more planning and execution systems 140, one or more external systems 150, and one or more supply chain entities 160 may operate on one or more computers 170 that are integral to or separate from the hardware and/or software that support risk management visualization system 110, archiving system 120, strategic planning system 130, one or more planning and execution systems 140, one or more external systems 150, and one or more supply chain entities 160. One or more computers 170 may include any suitable input device 172, such as a keypad, mouse, touch screen, microphone, or other device to input information. Output device 174 may convey information associated with the operation of supply chain network 100, including digital or analog data, visual information, or audio information. One or more computers 170 may include one or more processors 176 and associated memory to execute instructions and manipulate information according to the operation of virtual persona system 100 and any of the methods described herein. In addition, or as an alternative, embodiments contemplate executing the instructions on one or more computers that cause one or more computers 170 to perform functions of the method. An apparatus implementing special purpose logic circuitry, for example, one or more field programmable gate arrays (FPGA) or application-specific integrated circuits (ASIC), may perform functions of the methods described herein. Further examples may also include articles of manufacture including tangible non-transitory computer-readable media that have computer-readable instructions encoded thereon, and the instructions may comprise instructions to perform functions of the methods described herein.

According to embodiments, one or more computers 170 comprise one or more networked communication devices comprising one or more sensors. The one or more sensors of the one or more networked communication devices may comprise an imaging sensor, such as, a camera, scanner, electronic eye, photodiode, charged coupled device (CCD), or any other electronic component that detects visual characteristics (such as color, shape, size, fill level, or the like) of objects. The one or more networked communication devices may comprise, for example, a mobile handheld electronic device such as, for example, a smartphone, a tablet computer, a wireless communication device, and/or one or more networked communication devices configured to image items using the one or more sensors and transmit product images to one or more databases. In addition, or as an alternative, the one or more sensors may comprise a radio receiver and/or transmitter configured to read an electronic tag, such as, for example, a radio-frequency identification (RFID) tag. Each item may be represented in supply chain network 100 by an identifier, including, for example, Stock-Keeping Unit (SKU), Universal Product Code (UPC), serial number, barcode, tag, RFID, or like objects that encode identifying information. The one or more networked communication devices may generate a mapping of one or more items in supply chain network 100 by scanning an identifier or object associated with an item and identifying the item based, at least in part, on the scan. This may include, for example, a stationary scanner located at one or more supply chain entities 160 that scans items as the items pass near the scanner.

In addition, the one or more sensors of the one or more networked communication devices may be located at one or more locations local to, or remote from, the one or more networked communication devices, including, for example, the one or more sensors integrated into the one or more networked communication devices or the one or more sensors remotely located from, but communicatively coupled with, the one or more networked communication devices. According to some embodiments, the one or more sensors of networked communication devices may be configured to communicate directly or indirectly with one or more of risk management visualization system 110, archiving system 120, strategic planning system 130, one or more planning and execution systems 140, one or more external systems 150, one or more supply chain entities 160, one or more computers 170, and/or network 180 using one or more communication links 190a-190g.

Risk management visualization system 110, archiving system 120, strategic planning system 130, one or more planning and execution systems 140, one or more external systems 150, and one or more supply chain entities 160 may each operate on one or more separate computers 170, a network of one or more separate or collective computers 170, or may operate on one or more shared computers 170. In addition, supply chain network 100 may comprise a cloud-based computing system having processing and storage devices at one or more locations, local to, or remote from risk management visualization system 110, archiving system 120, strategic planning system 130, one or more planning and execution systems 140, one or more external systems 150, and one or more supply chain entities 160. In addition, each of one or more computers 170 may be a work station, personal computer (PC), network computer, notebook computer, tablet, personal digital assistant (PDA), cell phone, telephone, smartphone, mobile device, wireless data port, augmented or virtual reality headset, or any other suitable computing device.

In an embodiment, one or more users may be associated with risk management visualization system 110, archiving system 120, strategic planning system 130, one or more planning and execution systems 140, one or more external systems 150, and one or more supply chain entities 160. These one or more users may include, for example, a "manager" or a "planner" handling supply chain planning, configuration and operation of risk management visualization system 110, designing and optimization of supply chain network 100, and/or one or more related tasks within supply chain network 100. In addition, or as an alternative, these one or more users within supply chain network 100 may include, for example, one or more computers programmed to autonomously handle, among other things, production planning, demand planning, option planning, sales and operations planning, operation planning, supply chain master planning, plan adjustment after supply chain disruptions, order placement, automated warehouse operations (including removing items from and placing items in inventory), robotic production machinery (including producing items), and/or one or more related tasks within supply chain network 100.

One or more supply chain entities 160 may represent one or more suppliers, manufacturers, distribution centers, and retailers in one or more supply chain networks, including one or more enterprises. One or more suppliers may be any suitable entity that offers to sell or otherwise provides one or more components to one or more manufacturers. One or more suppliers may, for example, receive a product from a first supply chain entity in supply chain network 100 and provide the product to another supply chain entity. One or more suppliers may comprise automated distribution systems that automatically transport products to one or more manufacturers based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

A manufacturer may be any suitable entity that manufactures at least one product. A manufacturer may use one or more items during the manufacturing process to produce any manufactured, fabricated, assembled, or otherwise processed item, material, component, good or product. Items may comprise, for example, components, materials, products, parts, supplies, or other items, that may be used to produce products. In addition, or as an alternative, an item may comprise a supply or resource that is used to manufacture the item, but does not become a part of the item. In one embodiment, a product represents an item ready to be supplied to, for example, another supply chain entity, such as a supplier, an item that needs further processing, or any other item. A manufacturer may, for example, produce and sell a product to a supplier, another manufacturer, a distribution center, a retailer, a customer, or any other suitable person or an entity. Such manufacturers may comprise automated robotic production machinery that produce products based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

One or more distribution centers may be any suitable entity that offers to sell or otherwise distributes at least one product to one or more retailers and/or customers. Distribution centers may, for example, receive a product from a first supply chain entity in supply chain network 100 and store and transport the product for a second supply chain entity. Such distribution centers may comprise automated warehousing systems that automatically transport to one or more retailers or customers and/or automatically remove an item from, or place an item into, inventory based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

One or more retailers may be any suitable entity that obtains one or more products to sell to one or more customers. In addition, one or more retailers may sell, store, and supply one or more components and/or repair a product with one or more components. One or more retailers may comprise any online or brick and mortar location, including locations with shelving systems. Shelving systems may comprise, for example, various racks, fixtures, brackets, notches, grooves, slots, or other attachment devices for fixing shelves in various configurations. These configurations may comprise shelving with adjustable lengths, heights, and other arrangements, which may be adjusted by an employee of one or more retailers based on computer-generated instructions or automatically by machinery to place products in a desired location, and which may be based, at least in part, on a risk profile, a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein.

Although one or more suppliers, manufacturers, distribution centers, and retailers are shown and described as separate and distinct entities, the same entity may simultaneously act as any one or more suppliers, manufacturers, distribution centers, and retailers. For example, one or more manufacturers acting as a manufacturer could produce a product, and the same entity could act as a supplier to supply a product to another supply chain entity. Although one example of a supply chain network is shown and described, embodiments contemplate any configuration of supply chain network 100, without departing from the scope of the present disclosure.

In one embodiment, risk management visualization system 110 may be coupled with network 180 using communication link 190a, which may be any wireline, wireless, or other link suitable to support data communications between risk management visualization system 110 and network 180 during operation of supply chain network 100, archiving system 120 may be coupled with network 180 using communication link 190b, which may be any wireline, wireless, or other link suitable to support data communications between archiving system 120 and network 180 during operation of supply chain network 100, strategic planning system 130 may be coupled with network 180 using communication link 190c, which may be any wireline, wireless, or other link suitable to support data communications between strategic planning system 130 and network 180 during operation of supply chain network 100. The one or more planning and execution systems 140 may be coupled with network 180 using communication link 190d, which may be any wireline, wireless, or other link suitable to support data communications between one or more planning and execution systems 140 and network 180 during operation of supply chain network 100. One or more external systems 150 are coupled with network 180 using communication link 190e, which may be any wireline, wireless, or other link suitable to support data communications between one or more external systems 150 and network 180 during operation of supply chain network 100. One or more supply chain entities 160 may be coupled with network 180 using communication link 190f, which may be any wireline, wireless, or other link suitable to support data communications between one or more supply chain entities 160 and network 180 during operation of supply chain network 100. One or more computers 170 may be coupled with network 180 using communication link 190g, which may be any wireline, wireless, or other link suitable to support data communications between one or more computers 170 and network 180 during operation of supply chain network 100.

Although one or more communication links 190a-190g are shown as generally coupling risk management visualization system 110, archiving system 120, strategic planning system 130, one or more planning and execution systems 140, one or more external systems 150, one or more supply chain entities 160, and one or more computers 170 to network 180, each of risk management visualization system 110, archiving system 120, strategic planning system 130, one or more planning and execution systems 140, one or more external systems 150, one or more supply chain entities 160, and one or more computers 170 may communicate directly with each other, according to particular needs.

In another embodiment, network 180 includes the Internet and any appropriate local area networks (LANs), metropolitan area networks (MANs), or wide area networks (WANs) coupling risk management visualization system 110, archiving system 120, strategic planning system 130, one or more planning and execution systems 140, one or more external systems 150, one or more supply chain entities 160, and one or more computers 170. For example, data may be maintained by locally to, or externally of, risk management visualization system 110, archiving system 120, strategic planning system 130, one or more planning and execution systems 140, one or more external systems 150, one or more supply chain entities 160, and one or more computers 170 and made available to one or more associated users of risk management visualization system 110, archiving system 120, strategic planning system 130, one or more planning and execution systems 140, one or more external systems 150, one or more supply chain entities 160, and one or more computers 170 using a network or in any other appropriate manner. Those skilled in the art will recognize that the complete structure and operation of a network and other components within supply chain network 100 are not depicted or described. Embodiments may be employed in conjunction with known communications networks and other components.

According to the principles of embodiments described herein, strategic supply chain planner 130 and/or one or more planning and execution systems 140 may generate a supply chain plan. Furthermore, one or more computers 170 associated with strategic supply chain planner 130 and/or one or more planning and execution systems 140 may instruct automated machinery (i.e., robotic warehouse systems, robotic inventory systems, automated guided vehicles, mobile racking units, automated robotic production machinery, robotic devices and the like) to adjust product mix ratios, inventory levels at various stocking points, production of products of manufacturing equipment, proportional or alternative sourcing of one or more supply chain entities 160, and the configuration and quantity of packaging and shipping of items based on a supply chain plan, the number of items currently in stock at one or more supply chain entities 160, the number of items currently in transit in transportation network 140a, a forecasted demand, a supply chain disruption, a material or capacity reallocation, current and projected inventory levels at one or more stocking locations, and/or one or more additional factors described herein. For example, the methods described herein may include one or more computers 170 receiving product data from automated machinery having at least one sensor and the product data corresponding to an item detected by the automated machinery. The received product data may include an image of the item, an identifier, as described above, and/or product information associated with the item, including, for example, dimensions, texture, estimated weight, and the like. One or more computers 170 may also receive, from the one or more sensors of one or more external systems 150, a current location of the identified item.

The methods may further include one or more computers 170 looking up the received product data one or more databases to identify the item corresponding to the product data received from automated machinery. Based on the identification of the item, one or more computers 170 may also identify (or alternatively generate) a first mapping the database system, where the first mapping is associated with the current location of the identified item. One or more computers 170 may also identify a second mapping in the database system, where the second mapping is associated with a past location of the identified item. One or more computers 170 may also compare the first mapping and the second mapping to determine if the current location of the identified item in the first mapping is different than the past location of the identified item in the second mapping. One or more computers 170 may send instructions to the automated machinery based, at least in part, on one or more differences between the first mapping and the second mapping such as, for example, to locate items to add to or remove from an inventory of or shipment for one or more supply chain entities 160. In addition, or as an alternative, strategic supply chain planner 130 and/or one or more planning and execution systems 140 monitors one or more supply chain constraints of one or more items at one or more supply chain entities 160 and adjusts the orders and/or inventory of one or more supply chain entities 160 at least partially based on one or more supply chain constraints.

Figure 2:
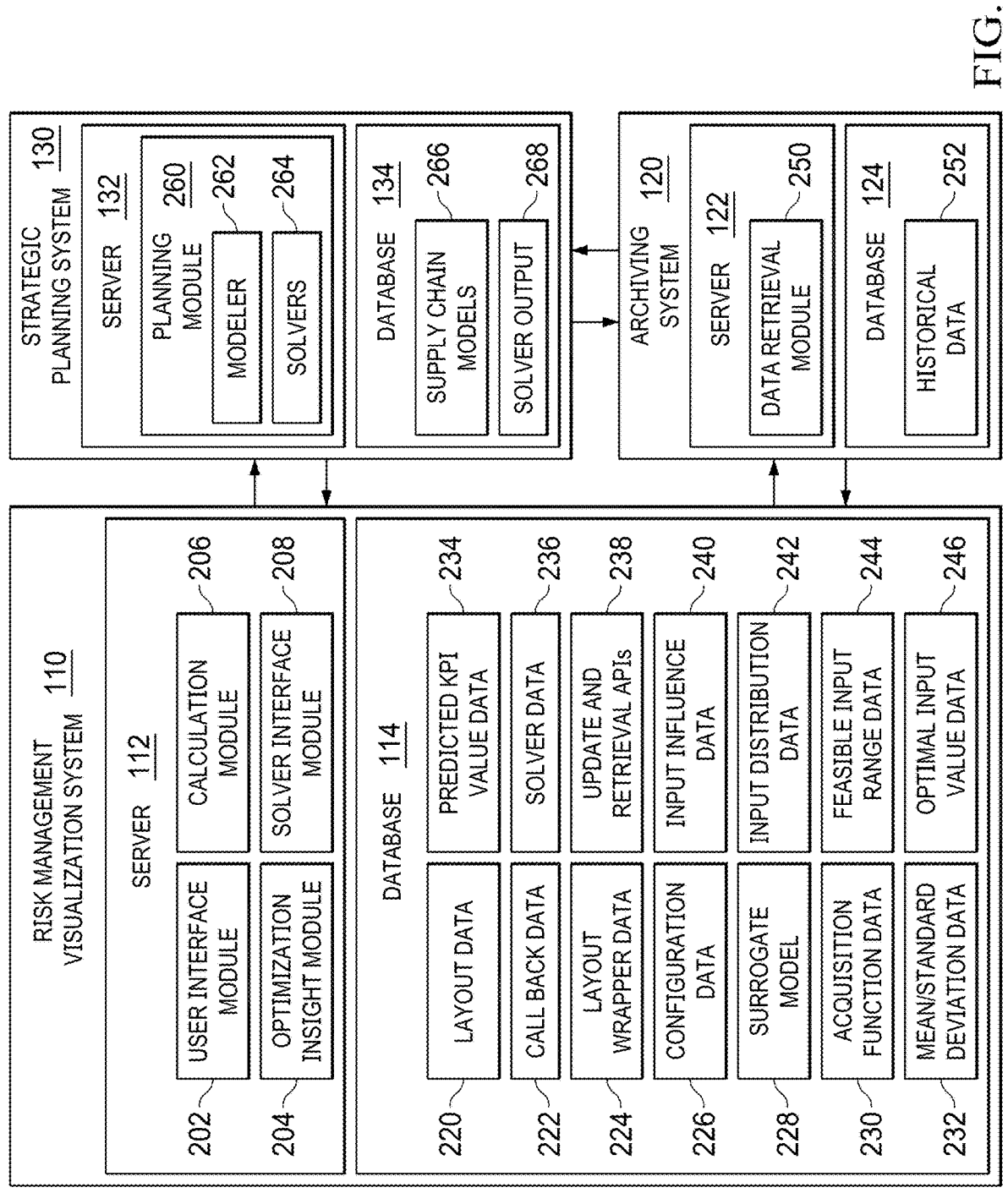
FIG. 2 illustrates the risk management visualization system, archiving system, and strategic planning system of FIG. 1 in greater detail, according to an embodiment.

FIG. 2 illustrates risk management visualization system 110, archiving system 120, and strategic planning system 130 of FIG. 1 in greater detail, according to an embodiment. Risk management visualization system 110 comprises server 112 and database 114, as discussed above. Although risk management visualization system 110 is shown as comprising a single server 112 and a single database 114, embodiments contemplate any suitable number of servers or databases internal to or externally coupled with risk management visualization system 110.

Server 112 of risk management visualization system 110 comprises user interface module 202, optimization insight module 204, calculation module 206, and solver interface module 208. Although server 112 is shown and described as comprising a single user interface module 202, a single optimization insight module 204, a single calculation module 206, and a single solver interface 208, embodiments contemplate any suitable number or combination of these located at one or more locations local to, or remote from, risk management visualization system 110, such as on multiple servers or computers at one or more locations in supply chain network 100.

Database 114 of risk management visualization system 110 may comprise one or more databases or other data storage arrangement at one or more locations, local to, or remote from, server 112. Database 114 of risk management visualization system 110 comprises, for example, layout data 220, call back data 222, layout wrapper data 224, configuration data 226, surrogate model 228, acquisition function data 230, mean and standard deviation data 232, predicted KPI value data 234, solver data 236, update and retrieval Application Programming Interfaces (APIs) 238, input influence data 240, input distribution data 242, feasible input range data 244, and optimal input data 246. Although database 114 of risk management visualization system 110 is shown and described as comprising layout data 220, call back data 222, layout wrapper data 224, configuration data 226, surrogate model 228, acquisition function data 230, mean and standard deviation data 232, predicted KPI value data 234, solver data 236, update and retrieval Application Programming Interfaces (APIs) 238, input influence data 240, input distribution data 242, feasible input range data 244, and optimal input data 246, embodiments contemplate any suitable number or combination of these, located at one or more locations local to, or remote from, risk management visualization system 110 according to particular needs.

User interface (UI) module 202 of risk management visualization system 110 generates and displays a UI, such as, for example, a GUI, that displays risk profile visualizations on risk management dashboard 900. According to embodiments, UI module 202 comprises a GUI displaying interactive elements on risk management dashboard 900 for modifying or selecting one or more KPIs, input values, and upper and lower bounds of a risk range. Optimization insight module 204 of risk management visualization system 110 generates one or more KPI risk profiles, including retrieving and updating data for the visualizations displayed by UI module 202. According to embodiments, optimization insight module 204 runs calculation processes for displayed metrics of the visualization dashboard. According to embodiments where the mean and standard deviation are known, optimization insight module 204 models the data according to one or more distribution patterns such as, for example, Gaussian distribution, Beta and Gamma distribution, and the like. In other embodiments, calculation module 206 receives historical data 252 from archiving system 120 and calculates the mean and standard deviation for one or more input values.

In addition or as an alternative, optimization insight module 204 utilizes calculation module 206 to calculate predictions of the KPIs for all possible combinations of inputs using surrogate model 228 from the Bayesian 'black box' optimization process. In one embodiment, calculation module 206 performs fitting of Gaussian processes using the Bayesian black box optimization process. As described herein, calculation module 206 builds surrogate model 228 predictions using Gaussian processes to fit a limited number of data points that are calculated by one or more solvers 264 of strategic planning system 130.

Solver interface module 208 comprises a system interface that receives calculated KPI values from one or more solvers 264 of strategic planning system 130 for one or more sample input values. The sample input values and the calculated KPI values comprise data points used by calculation module 206 to fit surrogate model 228. In one embodiment, solver interface module 208 comprises sends calls to one or more solvers 264 of strategic planning system 130 and receives responses from one or more solvers 264 in JavaScript Object Notation (JSON), or any other suitable format. Although solver interface module 208 is shown and described as transmitting sample input values to one or more solvers 264 of strategic planning system 130 and receiving the calculated KPI values, embodiments contemplate solver interface module 208 communicating with one or more solvers of any one or more planning and execution systems 140 of supply chain network 100 to calculate KPIs based on any suitable inputs, according to particular needs.

The various types of data stored in database 114 of risk management visualization system 110 will now be discussed.

Layout data 220 stored in database 114 comprises one or more layout configurations arranged according to an index. The index configures the display and source of the visualizations and interactive elements displayed by risk management dashboard 900. UI module 202 uses one or more call back scripts (call back data 222) to transmit requests to solver interface module 208, process solver output 268 received from one or more solvers 264, and update one or more visualizations of risk management dashboard 900 according to the processed solver output 268. Layout wrapper 224 comprises a python module that prepares UI component values. When launching risk management dashboard 900, UI module 202 accesses configuration data 226 describing the inputs and KPIs that are displayed on risk management dashboard 900. For a different dashboard, configuration data 226 may specify a different KPI and different inputs. As disclosed above, risk management visualization system 110 retrieves the mean and standard deviation from mean and standard deviation data 232 for the inputs identified in configuration data 226. Calculation module 206 builds surrogate model 228 by approximating the relationship between a single input value and a resulting KPI. To find better sample points for building surrogate model 228, calculation module 206 uses acquisition function stored in acquisition function data 230 to find inputs with high uncertainties and inputs with high derivative values. Risk management visualization system 110 predicts KPI values which are stored in predicted KPI value data 134 from surrogate model 228 of each input and a range of KPI uncertainty based on the selected risk range and the variability and range of the inputs, as described in further detail below.

Update and retrieval APIs 238 comprise code used by solver interface module 208 to communicate with one or more solvers 268 of strategic planning system 130. In addition, or as an alternative, update and retrieval APIs 138 update and/or retrieve data from one or more of archiving system 120, strategic planning system 130, one or more planning and execution systems 140, one or more external systems 150 and one or more supply chain entities 160, according to particular needs.

Risk management visualization system 110 calculates input influence stored as input influence data 240 for one or more KPI values. To determine input influence, risk management visualization system 110 calculates and displays input distributions stored as input distributions data 242, feasible input range stored as feasible input range data 244, and an optimal input value stored as optimal input value data 246, as disclosed in further detail below. According to embodiments, input distributions comprise a range of values for the inputs and the probability of their occurrence. Feasible input range comprises the values of the inputs that produce a KPI that is within a selected risk range of the predicted optimal KPI. Optimal input value comprises a value of the input variable predicted to give the optimal KPI (e.g. a maximum value of a KPI (for a maximization function) or a minimum value of a KPI (for a minimization function)).

As disclosed above, archiving system 120 comprises server 122 and database 124. Although archiving system 120 is shown as comprising a single server 122 and a single database 124, embodiments contemplate any suitable number of servers or databases internal to or externally coupled with archiving system 120.

Server 122 of archiving system 120 comprises data retrieval module 250. Although server 122 is shown and described as comprising a single data retrieval module 250, embodiments contemplate any suitable number or combination of data retrieval modules located at one or more locations, local to, or remote from archiving system 120, such as on multiple servers or computers at one or more locations in supply chain network 100.

Database 124 of archiving system 120 may comprise one or more databases or other data storage arrangement at one or more locations, local to, or remote from, server 122. Database 124 of archiving system 120 comprises, for example, historical data 252. Although database 124 of archiving system 120 is shown and described as comprising historical data 252, embodiments contemplate any suitable number or combination of data, located at one or more locations, local to, or remote from, archiving system 120, according to particular needs.

In one embodiment, data retrieval module 250 of archiving system 120 receives historical data 252 from one or more planning and execution systems 140 and one or more supply chain entities 160 and stores the received historical data 252 in database 124. According to one embodiment, data retrieval module 250 may prepare historical data 252 for use by risk management visualization system 110, strategic planning system 130, and/or one or more planning and execution systems 140 by checking historical data 252 for errors and transforming historical data 252 to normalize, aggregate, and/or rescale historical data 252 to allow direct comparison of data received from different planning and execution systems 140 and one or more supply chain entities 160 at one or more other locations local to, or remote from, archiving system 120. According to embodiments, data retrieval module 250 receives data from one or more external systems 150, such as, for example, weather data, special events data, social media data, calendars, and the like and stores the received data as historical data 252. Historical data 252 may be received from one or more planning and execution systems 140, one or more external systems 150, one or more supply chain entities 160, one or more computers 170, and/or one or more locations local to, or remote from, supply chain network 100. Historical data 252 may comprise, for example, historic sales patterns, prices, promotions, weather conditions and other factors influencing demand of one or more items sold in one or more stores over a time period, such as, for example, one or more days, weeks, months, years, including, for example, a day of the week, a day of the month, a day of the year, week of the month, week of the year, month of the year, special events, paydays, and the like. In addition, historical data 252 may comprise any other historical data from supply chain network 100, such as any input to any process, plan, or calculation, any output from any solver or other module of any planning and execution system 140, and any statistical, aggregated, disaggregated, or otherwise transformed data from any input or output.

As disclosed above, strategic planning system 130 comprises server 132 and database 134. Although strategic planning system 130 is shown as comprising a single server and a single database, embodiments contemplate any suitable number of servers or databases internal to or externally coupled with strategic planning system 130.

Server 132 of strategic planning system 130 comprises planning module 260. Although server 132 is shown and described as comprising a single planning module 260, embodiments contemplate any suitable number or combination of planning modules located at one or more locations, local to, or remote from strategic planning system 130, such as on multiple servers or computers at one or more locations in supply chain network 100. Planning module 260 may comprise modeler 262 and one or more solvers 264. Although planning module 260 is shown and described as comprising a single modeler 262 and a single one or more solvers 264, embodiments contemplate any suitable number or combination of these located at one or more locations, local to, or remote from planning module 260, such as on multiple servers or computers at any location in supply chain network 100.

Database 134 of strategic planning system 130 may comprise one or more databases or other data storage arrangement at one or more locations, local to, or remote from, server 132. Database 134 of strategic planning system 130 comprises, for example, supply chain models 266 and solver output 268. Although database 134 of strategic planning system 130 is shown and described as comprising supply chain models 266 and solver output 268, embodiments contemplate any suitable number or combination of data, located at one or more locations, local to, or remote from, supply chain strategic planning system 130, according to particular needs.

Modeler 262 of strategic planning system 130 may model one or more supply chain planning problems, what if scenarios, and network models of supply chain network 100. According to one embodiment, modeler 262 identifies resources, operations, buffers, and pathways, and maps supply chain network 100. For example, modeler 262 models a supply chain planning problem that represents supply chain network 100 as a supply chain network model, an LP optimization problem, or other input to one or more solvers 264. According to embodiments, one or more solvers 264 of planning module 260 generates a solution to a supply chain planning problem. One or more solvers 264 may comprise an LP optimization solver, a heuristic solver, a deep tree solver, a mixed-integer problem solver, and the like. According to embodiments, one or more solvers 264 receives one or more input values and generates one or more output values. The input values may comprise costs, constraints, and other like inputs, and the output values may comprise any KPI. Supply chain models 266 comprise one or more modelled supply chain networks, planning problems, manufacturing processes, and the like, supply chain models 266 may represent the flow of materials through one or more supply chain entities 160 of supply chain network 100.

Modeler 262 may model the flow of materials through one or more supply chain entities 160 of supply chain network 100 as one or more supply chain network models comprising a network of nodes and edges. The material storage and/or transition units are modelled as nodes, which may be referred to as, for example, buffer nodes, buffers, or nodes.

Each node may represent a buffer for an item (such as, for example, a raw material, intermediate good, finished good, component, and the like), resource, or operation (including, for example, a production operation, assembly operation, transportation operation, and the like). Various transportation or manufacturing processes are modelled as edges connecting the nodes. Each edge may represent the flow, transportation, or assembly of materials (such as items or resources) between the nodes by, for example, production processing or transportation. A planning horizon for supply chain network 100 models may be broken down into elementary time-units, such as, for example, time-buckets, or, simply, buckets. The edge between two buffer nodes may denote processing of material and the edge between different buckets for the same buffer may indicate inventory carried forward. Flow-balance constraints for most, if not every buffer in every bucket, model the material movement in supply chain network 100. Supply chain models 266 may include any dynamic supply chain data, including for example, the one or more material constraints, one or more capacity constraints, lead times, yield rates, inventory levels, safety stock, demand dates, and/or the like. In addition, or as an alternative, supply chain models 266 may include supply chain costs (such as, for example, processing and handling costs, transportation costs, inventory costs, fixed costs for operating, opening or closing modelled components or entities, and the like).

Solver output 268 comprises a solution, a KPI value, a plan, or other like output from one or more solvers 264. In one embodiment, one or more solvers 264 receive input values and transmit KPI values as solver output 268. To get the output data from one or more solvers 264, risk management visualization system 110 communicates with one or more solvers 264 to trigger one or more solvers 264 to fetch initial data to analyze. In one embodiment, one or more solvers 264 comprises a linear programming optimization solver and the output results comprise the KPI values requested by risk management visualization system 110. As disclosed above, risk management visualization system 110 may transmit requests to one or more solvers 264 using update and retrieval APIs 238. According to embodiments, update and retrieval APIs 238 may comprise parameters that indicate, for example, a particular model to be used by one or more solvers 264, the identity and value of particular inputs, the format of results, and the like.

Figure 3:
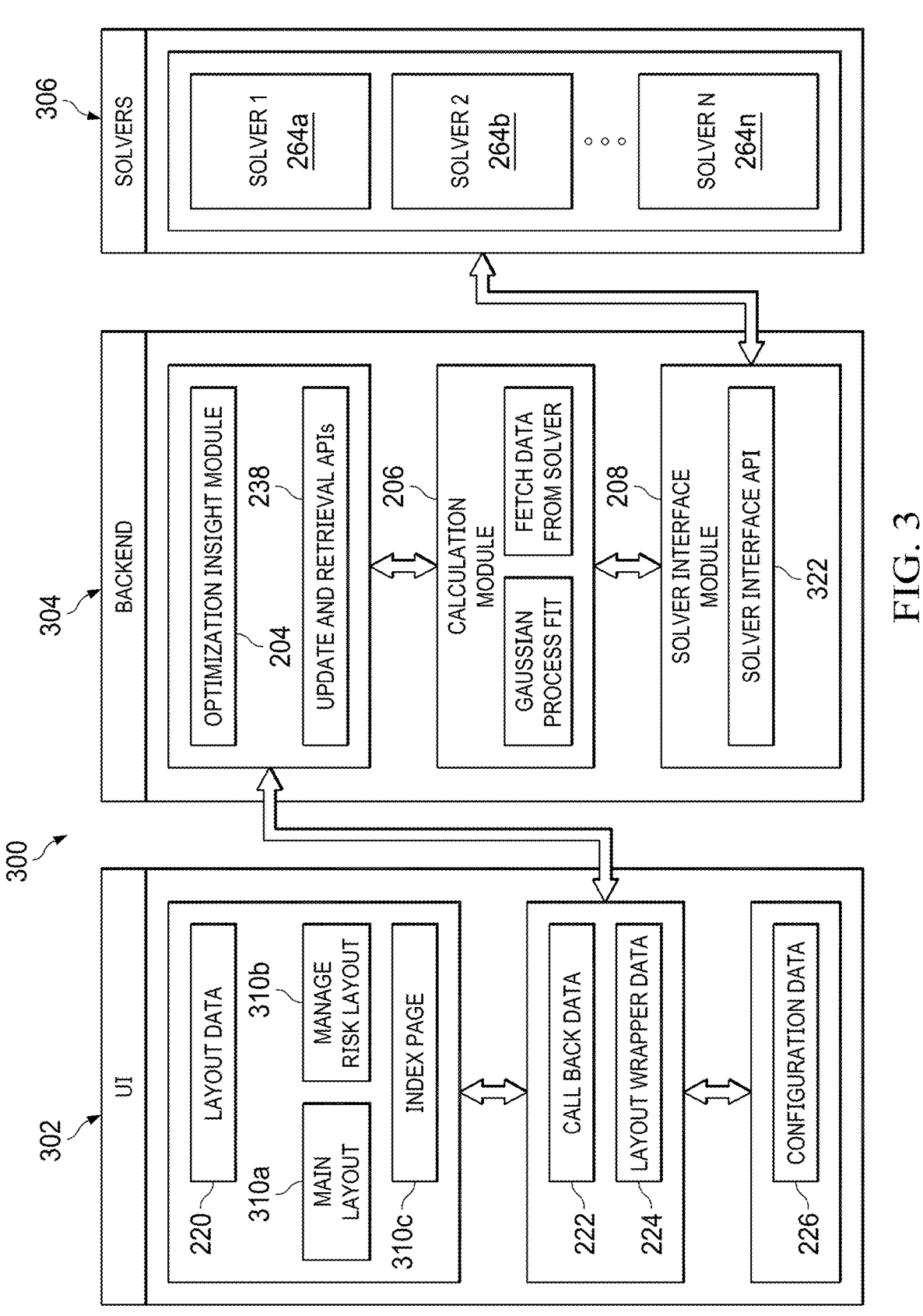
FIG. 3 illustrates the risk management visualization system of FIG. 1, according to an alternative embodiment.

FIG. 3 illustrates risk management visualization system 110 of FIG. 1, according to an alternative embodiment. In this embodiment, risk management visualization system 110 comprises three layers: UI layer 302, backend layer 304, and solvers layer 306. In this alternative embodiment, UI layer 302 comprises UI module 202, layout data 220, call back data 222, layout wrapper data 224, and configuration data 226. Continuing with this alternative embodiment, backend layer 304 comprises optimization insight module 204, update and retrieval APIs 238, calculation module 206, and solver interface module 208. In addition, solvers layer 306 comprises one or more solvers 264a-264n that calculate the KPI of a supply chain planning problem for one or more input values received from risk management visualization system 110, as disclosed above.

In one embodiment, layout wrapper data 224 couples UI layer 302 to backend layer 304 and fetches values to display in risk management dashboard 900. In one embodiment, UI module 202 displays the visualizations and the interactive elements on risk management dashboard 900 using, for example, python script modules: a main layout 310a, a risk management layout 310b, and an index page 310c. According to embodiments, index page 310c retrieves the KPI names and input names from one or more configuration files of configuration data 226. In addition, or as an alternative, main layout 310a configures the risk management dashboard 900 and its UI components. Embodiments of the risk management layout 310b are called in response to selection of REPLAN button 918 of risk management dashboard 900, as described in further detail below. As disclosed above, UI module 202 uses one or more call back scripts of call back data 222 to transmit requests to solver interface module 208, process solver output 268 received from one or more solvers 264a-264n, and update one or more visualizations of risk management dashboard 900 according to a processed solver output 268 from one or more solvers 264a-264n. Layout wrapper data 224 comprises prepares component values for UI module 202 of UI layer 302.

Configuration data 226 of UI layer 302 describes the inputs and KPIs that are displayed on risk management dashboard 900. For a different dashboard, configuration data 226 may specify a different KPI and different inputs. Backend layer 304 retrieves the mean and standard deviation from mean and standard deviation data 232 for the inputs identified in configuration data 226. When mean and standard deviation data 232 are not available, backend layer 304 calculates the mean and standard deviation from the distribution of values for the input variables according to historical data 252.

Calculation module 206 builds surrogate model by approximating the relationship between a single input value and a resulting KPI. During an exploration phase, one or more solvers 264a-264n of solvers layer 306 receives one or more sample inputs for the initial exploration and calculates the resulting KPI values. During a learning phase, one or more solvers 264a-264n receives input variable values for new exploration points and calculates the resulting KPI values.

To find better sample points for building surrogate model 228, calculation module 206 uses acquisition function 230 to find inputs with high uncertainties and inputs with high derivative values. Acquisition function 230 may comprise, for example, the maximum probability of improvement (MPI) acquisition model, the expected improvement (EI) acquisition model, the upper confidence bound (UCB) acquisition model, and the like, according to particular needs. To get the sample data used to build surrogate model 228, backend layer 304 uses data update and retrieval APIs 238 to trigger one or more solvers 264a-264n to fetch initial data to analyze, to determine the status of a calculation, the state of one or more solvers 264a-264n, and the like.

Calculation module 206 uses the UCB as the acquisition function and collects the sample data from one or more solvers 264a-264n of solver layer 306 with the assumption that input data is normally distributed with the mean and standard deviation calculated from the historical input data. Initial exploration points 302a-302c are calculated and may include, for example, minimum, maximum, and mean, as described in further detail below. Calculation module 206 of backend layer 304 predicts KPI values from a surrogate model of each input and a range of KPI uncertainty based on the selected risk range and the variability and range of the inputs, as shown and described in further detail in connection with visualization dashboard 900, below.

Although an alternative embodiment of risk management visualization system 110 is shown and described as comparing a system architecture having UI layer 302, backend layer 304, and solvers layer 306, embodiments contemplate any suitable arrangement or combination of any number of layers, according to particular needs.

Figure 4:
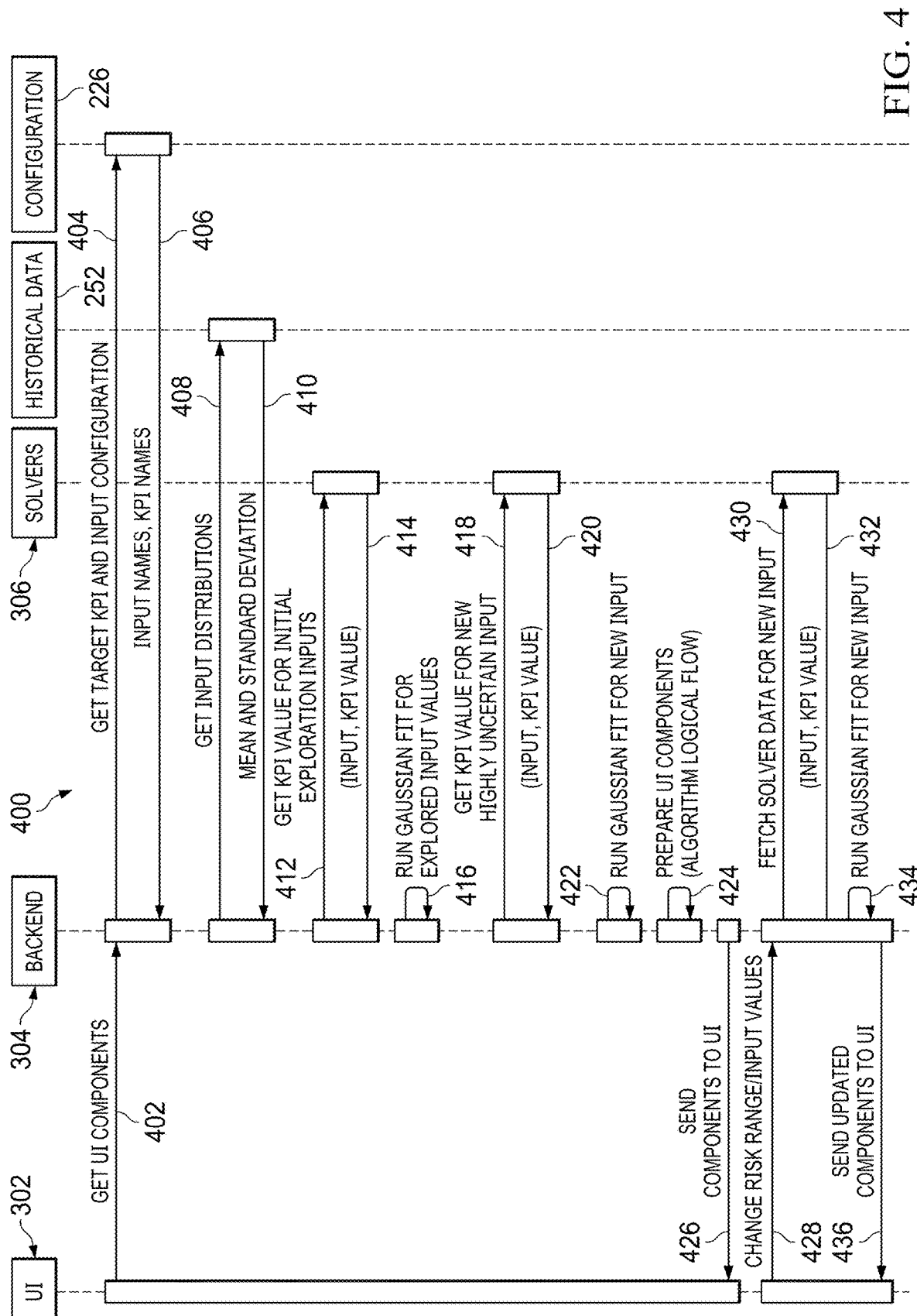
FIG. 4 illustrates a sequence diagram, according to an embodiment.

FIG. 4 illustrates sequence diagram 400, according to an embodiment. Sequence diagram 400 describes the relationship and interaction of modules and data of risk management visualization system 110: UI layer 302, backend layer 304, solver layer 306, historical data 252, and configuration data 226. Although risk management visualization system 110 is shown and described in sequence diagram as comprising UI layer 302, backend layer 304, solver layer 306, historical data 252, and configuration data 226, embodiments contemplate other suitable combinations and arrangements of risk management visualization system 110, according to particular needs.

Sequence diagram 400 begins with UI module 202 of UI layer 302 launching risk management dashboard 900 and making a call to backend layer 304 for one or more UI components at activity 402. In response, at activity 404, backend layer 304 accesses configuration data 226 to locate the inputs and the KPIs to be displayed by risk management dashboard 900. As described in further detail below, risk management dashboard 900 displays a risk profile of a KPI for one or more inputs. By way of example only and not by way of limitation, the KPI may comprise, for example, a network cost, and the four inputs may comprise, for example, fixed costs, MaxCycle, a lead time for a first item, and a lead time for a second item. Although the risk management dashboard is shown and described in connection with a network cost KPI and four particular inputs, embodiments, contemplate configuration data 226 identifying any suitable target KPIs and input configurations, according to particular needs. Continuing with sequence diagram 400, based, at least in part, on the inputs identified in configuration data 226 at activity 406, backend layer 304 of risk management visualization system 110 retrieves the input distributions from the historical data 252 at activity 408. In addition, or as an alternative, backend layer 304 retrieves mean and standard deviation from historical data 252 at activity 410.

Based, at least in part, on the mean and standard deviation, backend layer 304 of risk management visualization system 110 models input distributions and selects initial exploration points, transmits the initial exploration points to one or more solvers 264a-264n of solvers layer 306 at activity 412, and receives the input and KPI values form one or more solvers 264a-264n at activity 414. According to an embodiment, activities 412-414 comprise a first solver run where one or more modules of backend layer 304 pass the exploration input points to one or more solvers 264a-264n of solvers layers 306 and receives solver output data 268 in return.

At activity 416, backend layer 304 of risk management visualization system 110 fits a Gaussian process to input exploration points. When the KPI relationship to the inputs is too complex, backend layer 304 of risk management visualization system 110 may transmit, at activity 418, more uncertain points (i.e. values of the input variables where the predicted KPI is uncertain) to one or more solvers 264a-264n of solvers layer 306 and receive, at activity 420, more KPI values from one or more solvers 264a-264n. One or more modules of backend layer 304 processes the received KPI values as additional input by the Gaussian process fit at activity 422. Backend layer 304 identifies these values of the input variables and makes the calls on one or more solvers 264a-264n for the resulting KPI values. Iterations of activities 418-422 are repeated until one or more stopping criteria are met. Stopping criteria may comprise standard deviation criteria, where if the uncertainty is less than or equal to the given rates, then the iterations are stopped. Otherwise iterations of activities 418-422 may repeat to fetch the input from one or more solvers 264a-264n and run the Gaussian process fit until detecting one or more stopping criteria.

At activity 424 of sequence 400, one or more modules of backend layer 304 prepares one or more visualizations or interactive visual elements (UI components) of the UI based, at least in part, on calculations of backend layer 304. At activity 426, backend layer 304 transmits the UI components for display on risk management dashboard 900 by UI module 202 of UI layer 302. As described in further detail below, UI module 202 of UI layer 302 displays the calculations from backend layer 304 as one or more visualizations comprising a risk profile and one or more interactive elements the provide for adjusting the risk of the displayed risk profile. When risk management dashboard 900 displays risk profile that is beyond an acceptable level, one or more interactive elements may receive input from input devices 172 indicating a change to a risk range or values of input variables, at activity 428. When a new input variable value is not in the existing model calculated by one or more modules of backend layer 304, backend layer 304 places one or more additional calls to one or more solvers 264a-264n of solvers layer 306 to calculate additional values of the KPI at activity 430. Backend layer 304 receives solver output 268, and, at activity 434, backend layer 304 runs the Gaussian process fit iteratively, until one or more stopping criteria are detected, as disclosed above in connection with activities 418-422. Backend layer 304 sends the updated UI components to UI layer 302, wherein UI module 202 updates one or more visualization of risk management dashboard 900 based on the updated calculations. By way of further explanation only, and not by way of limitation, risk management dashboard is described in connection with the following examples.

Figure 5:
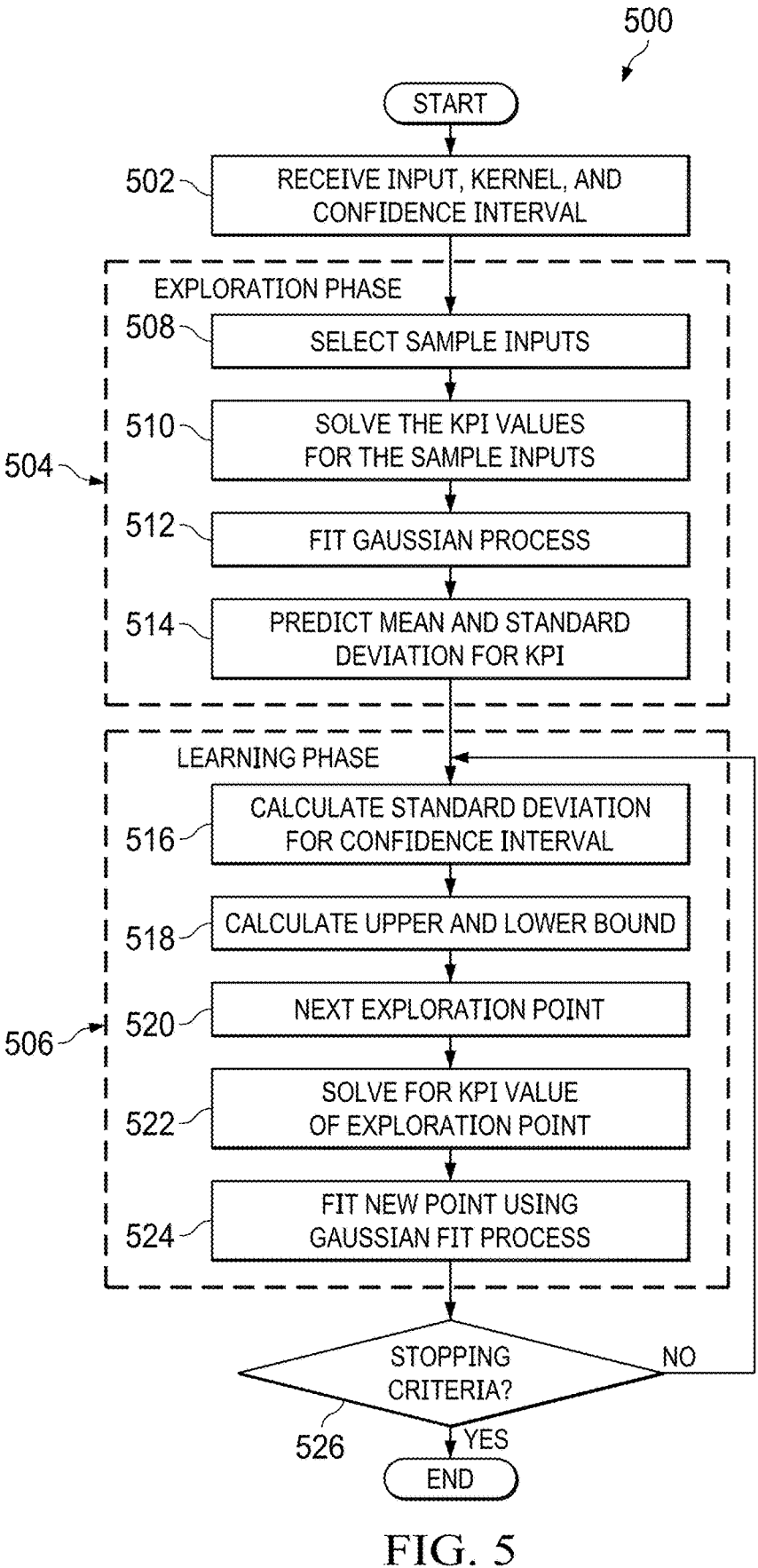
FIG. 5 illustrates a method comprising a Bayesian black box optimization using a Gaussian process fit, according to an embodiment.

FIG. 5 illustrates method 500 comprising a Bayesian black box optimization using a Gaussian process fit, according to an embodiment. Method 500 proceeds by one or more actions, which although described in a particular order, may be performed in one or more permutations, according to particular needs. The Bayesian black box optimization method creates a probabilistic representation of the solution of the KPI prediction function, which is computationally-expensive to solve. This representation is a surrogate model relating one or more random independent variables to a KPI. The surrogate model is constructed from Gaussian processes using sample data points comprising the input values to solver 264 and the resulting KPI output from solver 264. The Gaussian process represent unknown data points of the function as a range of uncertainty.

At action 502, risk management visualization system 110 receives the selected inputs, kernel, and confidence interval. Inputs are combinations of variables which affect the KPI value and which will be modeled and displayed by risk management visualization system 110. In one embodiment, the inputs comprise fixed costs, maximum factory cycles (Max Cycle), and lead time. Fixed costs comprise expenditures that do not vary with the production volume; for example, rent, property tax, and salaries of certain personnel. Max Cycles is the number of cycles to convert a full set of inputs to a full set of outputs for a process. In addition, or as an alternative, max cycles are a capacity (in terms of a time period (minutes, hours, or the like), resources, etc.) of a process to convert inputs to output, such as, for example, furnace hours. The lead time is the period elapsing between when an order is placed, and the order is received in storage.

By way of example only and not of limitation, a lead time of a speed post may comprise the 3 days to 7 days to reach destination. Risk management visualization system 110 uses a surrogate model and a kernel to learn the model and estimate the output values for the inputs.

According to embodiments, the kernel comprises RBF, Matern, or the sum of RBF and Matern. Although particular kernels are described, embodiments contemplate using any suitable kernel or sum of kernels, according to particular needs. The following actions 508-526 are divided into exploration phase 504 and learning phase 506. In action 508 of exploration phase 504, risk management visualization system 110 selects data points of the sample input for initial exploration. In one embodiment, risk management visualization system 110 selects three data points of the sample input for initial exploration comprising the mean, the max, and the min. At action 510 of exploration phase 504 risk management visualization system 110 communicates with solver 264 to calculate the KPI value for the sample inputs. According to embodiments, the KPI may be selected from one or more of Transit Inv. Cost, Transport Cost, Overhead Cost, and Network Profit. Although the KPI is described as comprising one or more of the KPI may be selected from one or more of Transit Inv. Cost, Transport Cost, Overhead Cost, and Network Profit, embodiments contemplate using any suitable KPI value, according to particular needs.

Transit inventory costs are the total inventory costs that are incurred for products that are transported between two facilities, or between a facility and a demand region. For example: An ecommerce seller ship merchandise to customer. The transport costs are the expenses involved in moving products or assets to a different place. By way of example only and not of limitation, transportation costs may include costs for loading, unloading, hauling, equipment used to haul, fuel, and the like. Overhead costs are the costs that are not product-related to the goods or services produced by the business. By way of example only and not of limitation, overhead costs may include janitorial costs, heat, power, light, maintenance, depreciation, taxes, insurance, and the like. The network profit is the optimal total network profit. Total revenue minus all costs incurred in the network (NetworkRevenue-NetworkCost). By way of example only and not of limitation, the network profit may comprise, when selling a cell phone to a customer, the sale price—the total cost incurred to manufacture the cell phone.

At action 512 exploration phase 504, risk management visualization system 110 performs a Gaussian process fit for the selected kernel, selected input data points, and calculated KPI values. At action 514 exploration phase 504, risk management visualization system 110 predicts a mean and standard deviation of the KPI value for an unexplored input range. Using the predicted mean and standard deviation of the KPI value for the unexplored input range, risk management visualization system 110 begins learning phase 506 to fit the Gaussian model to data that was unexplored in exploration phase 504.

At action 516 learning phase 506, risk management visualization system 110 calculates the size of the confidence interval selected previously. Using the standard deviation, $\sigma$, calculated above, risk management visualization system 110 determines the distance of the upper and lower bounds from the mean based on the selected confidence interval. At action 518 of learning phase 506, risk management visualization system 110 calculates the upper and lower bound of the KPI value with the mean predicted during exploration phase 504 and the confidence interval selected above. At action 520, risk management visualization system 110 selects the next exploration points, which are data points to explore and solve for the KPI value. In one embodiment, the exploration points are selected by finding input values with the highest uncertainty, or input values with the highest derivative value. In addition, or as an alternative, risk management visualization system 110 uses an acquisition function to select the next exploration points given the existing points already computed (exploited) by selecting the next exploration point where the KPI value is most uncertain according to the output of a selected acquisition function (MPI, EI, UCB). The new exploration points are sample points for building the surrogate model. Acquisition functions may comprise calculating a maximum probability of improvement (MPI) an Expected Improvement (EI), an Upper confidence bound (UCB), selecting the most uncertain input using the mean and the standard deviation, identifying one or more of the most uncertain inputs using the mean and standard deviation, and identifying one or more of the most uncertain inputs using distance of the data points from other data points, and the value of the uncertainty of the KPI value in the unexplored area. Although particular acquisition functions are described for calculating new exploration points, embodiments contemplate any suitable acquisition function, according to particular needs.

At action 522 of leaning phase 506, solver 264 calculates KPI values for one or more next exploration points. When the next exploration points are identified, risk management visualization system 110 receives, from solver 264, calculated KPI values for the next exploration points. At action 524 of learning phase 506, risk management visualization system 110 fits the Gaussian Process with calculated KPI values for the next exploration points. Risk management visualization system 110 may determine, at action 526, if one or more stopping criteria are detected. According to embodiments, the stopping criteria comprise detection of a particular mean, standard deviation, quantity of iterations, or the like. When the stopping criteria are not met, risk management visualization system 110 returns to action 516 of learning phase 506 and continues to explore new data points in the unexplored areas of the Gaussian fit model. When the stopping criteria are met, the method ends.

By way of explanation only and not by way of limitation, examples are now given to further describe calculating the variability of the KPI value using data received from a strategic planning system. Using the input variability (e.g. the ranges and distributions of inputs), risk management visualization system 110 utilizes Bayesian black box optimization with a Gaussian process fit to predict the output KPI value, for the calculated input variability for one or more inputs.

By way of explanation only and not of limitation, various scenarios, described in the examples below, illustrate methods of risk management visualization system 110 to select values of input variables and predict the probability of unknown KPI values. Although particular values and ranges of values are provided below (including, but not limited to, KPI values, input variables, predicted values, means, standard deviation, upper and lower bounds, and selected intervals), the values and ranges of values may be any suitable number or quantity, according to particular needs. Strategic Planning System. Example 1: Gaussian Process Fit with Random Exploration for a Max Cycle Input In this scenario, risk management visualization system 110 of a manufacturer evaluates a product cost management model to understand the changes in expected network profit, which is the KPI, when changing the maximum cycle, which is the random input variables. By way of example only and not by way of limitation, risk management visualization system 110 evaluates changing the maximum cycles at a factory from 80% to 120%. Unlike the exemplary scenarios described below, risk management visualization system 110 of Example 1 does not use an acquisition function to select values of Max Cycles to fit the Gaussian process. Instead, risk management visualization system 110 fits the Gaussian process at the various percentages of Max Cycles, in the order the solved mean network profit is received from solver 264. According to embodiments, the Gaussian Process fits data points one-by-one, as they are received, and randomly selects the next value of the input variable to evaluate.

According to an embodiment, the actual values of the mean network profits for each Max Cycle % are shown in the following TABLE 1:

TABLE 1

| KPI (Mean Value Network Profit) | Input Variable (Max Cycle %) |
| --- | --- |
| 1059462.13 | Max Cycle 80% |
| 1187323.64 | Max Cycle 82% |
| 1327948.9 | Max Cycle 84% |
| 1455751.5 | Max Cycle 86% |
| 1596313.41 | Max Cycle 88% |
| 1724096.98 | Max Cycle 90% |
| 1864649.12 | Max Cycle 92% |
| 2005104.26 | Max Cycle 94% |
| 2132739.88 | Max Cycle 96% |
| 2273130.41 | Max Cycle 98% |
| 2400732.04 | Max Cycle 100% |
| 2541069.03 | Max Cycle 102% |
| 2668642.51 | Max Cycle 104% |
| 2808878.95 | Max Cycle 106% |
| 2936316.48 | Max Cycle 108% |
| 3051801.12 | Max Cycle 110% |
| 3148329.13 | Max Cycle 112% |
| 3254439.5 | Max Cycle 114% |
| 3332428.82 | Max Cycle 116% |
| 3441271.78 | Max Cycle 118% |
| 3522568.72 | Max Cycle 120% |

TABLE 1 illustrates exemplary data points for mean network profit at various values of Max Cycle %, according to an embodiment. The KPI value, which here, is the mean network profit, is shown for selected percentages of change of the max cycles, the input variable, from 80% to 120% at each 2% interval.

Figure 6A:
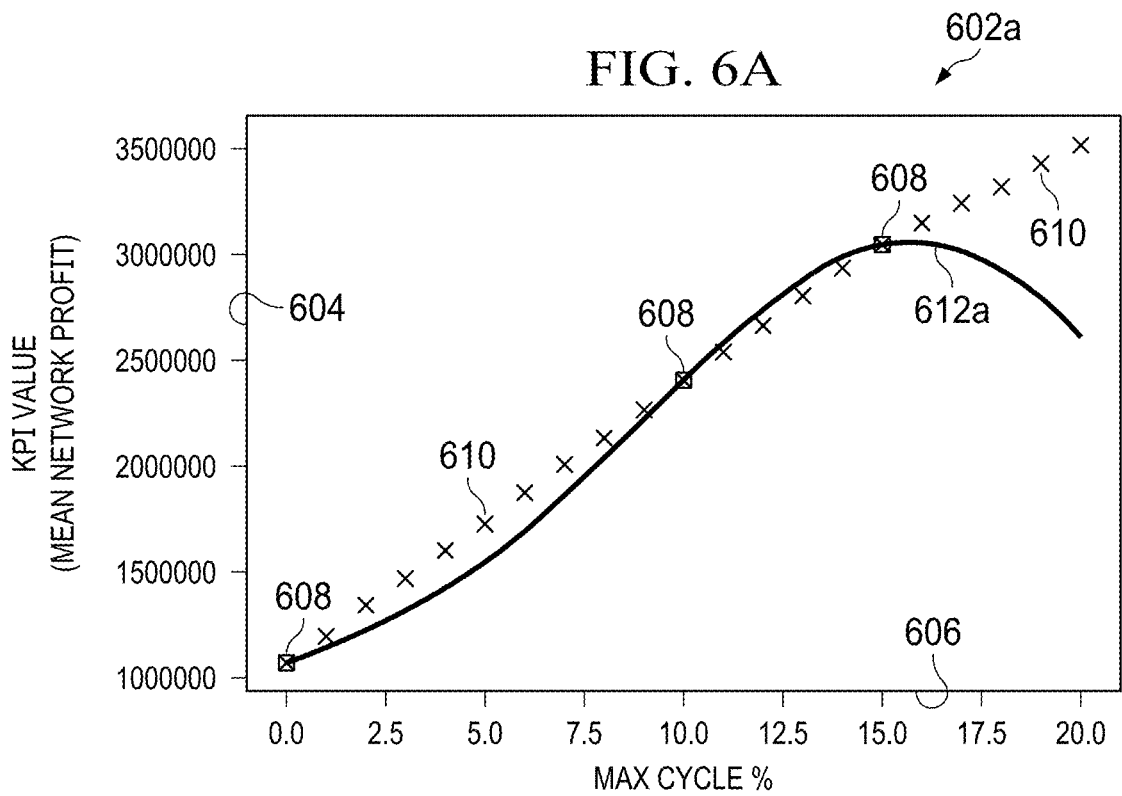
FIG. 6A illustrates a plot of fitting a Gaussian process to build a surrogate model for a function that calculates mean network profits from changes in max cycle percentage, according to an embodiment.

FIG. 6A illustrates plot 602a of fitting a Gaussian process to build the surrogate model for the function that calculates mean network profits from changes in max cycle percentage, according to an embodiment. Plot 602a comprises the actual values of the mean network profit calculated for each 2% change in max cycles, as shown in TABLE 1, with Y-axis illustrating KPI Value 604 and X-axis illustrating max cycle % 606. Squares 608 indicate the selected data points where risk management visualization system 110 has received the calculated network profit for a particular value of the input variable. X marks 610 indicate the surrogate model that is fit the selected data points. In this example, risk management visualization system 110 receives the calculated mean network profit from solver 264. Using the evaluated data points, risk management visualization system 110 fits Gaussian process fit 612a to the evaluated data points. In this example, the three data points (squares 608) were selected at 80%, 100%, and 110% Max Cycles which are plotted according to the calculated mean network profit, 1059462.13, 2400732.04, and 3051801.12, respectively.

Figure 6B:
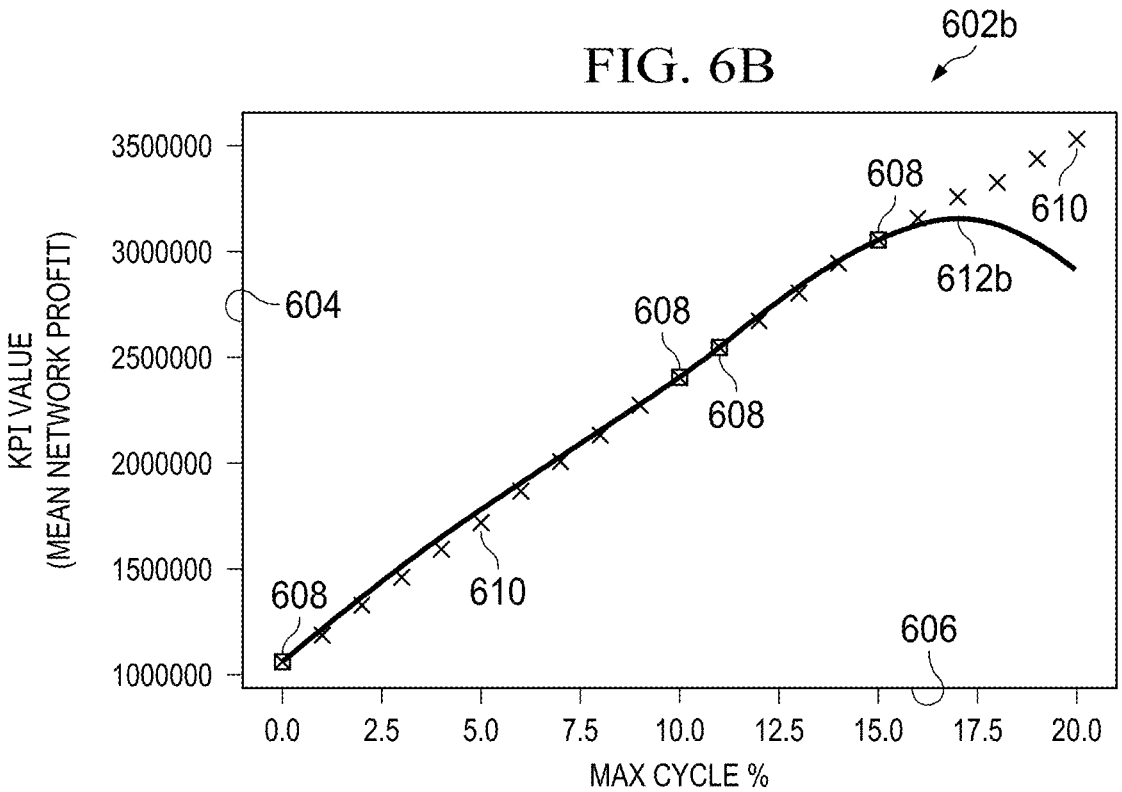
FIG. 6B illustrates a plot of fitting a Gaussian process to build a surrogate model with a randomly selected exploration point, according to an embodiment.

FIG. 6B illustrates plot 602b of fitting a Gaussian process to build the surrogate model with a randomly selected exploration point, according to an embodiment. As disclosed above, in the scenario of Example 1, risk management visualization system 110 fits the Gaussian process fit 612b at the various percentages of Max Cycles, in the order the solved mean network profit is received from solver 264. Here, the fourth data point and square 608 was received for 102% Max Cycles, which is calculated by solver 264 to result in a mean network profit of 2541069.03. Risk management visualization system 110 uses the new data point to refit the Gaussian process fit 612b, which now more closely aligns with the actual mean network profits for the values of the input variable.

Figure 6C:
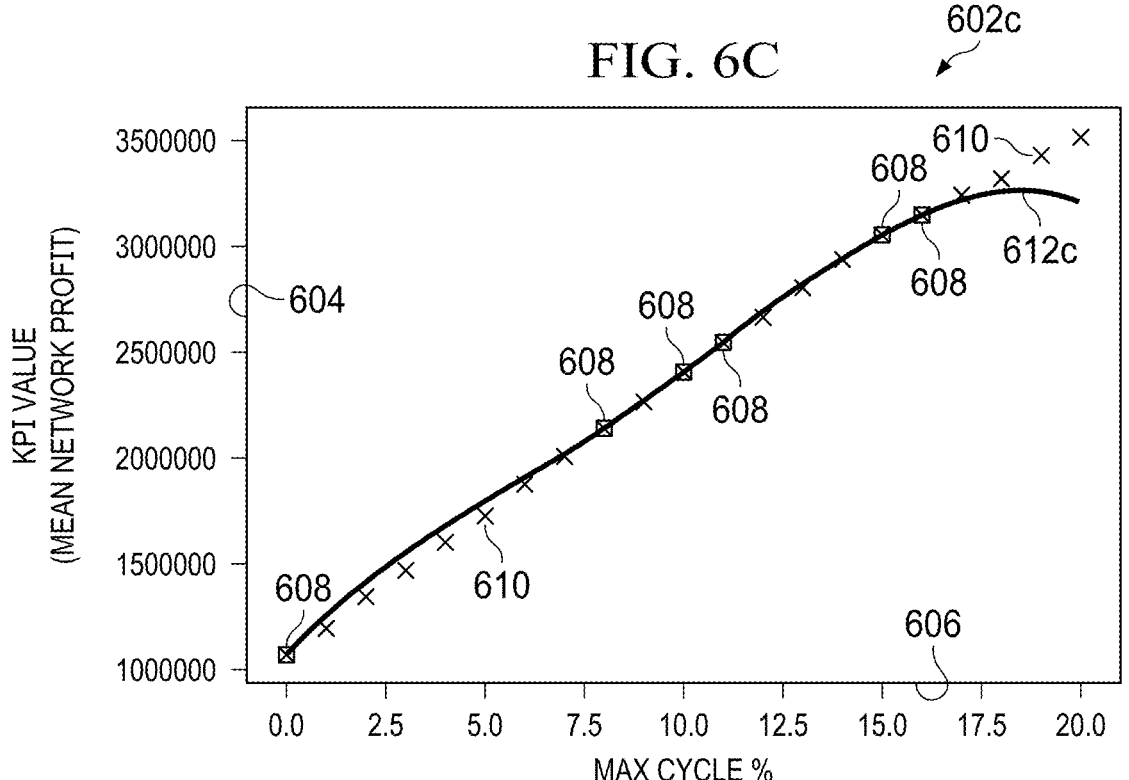
FIG. 6C illustrates a plot of fitting a Gaussian process to build a surrogate model with further randomly selected exploration points, according to an embodiment.

FIG. 6C illustrates plot 602c of fitting a Gaussian process to build the surrogate model with further randomly selected exploration points, according to an embodiment. Plot 602c illustrates the increasing closeness of the fit between the surrogate model to the actual values as six (6) data points and squares 608 are evaluated. As can be seen, the estimated mean network profit of the surrogate model deviates from the actual mean network profit for several values of the percentage of Max Cycles.

The following embodiment illustrates risk management visualization system 110 using an acquisition function to select data points, instead of the random process shown above.

Strategic Planning System. Example 2: Gaussian Process Fit with Max Variance Exploration for a Max Cycles Input This scenario comprises the same manufacturer as Example 1. In this scenario, the manufacturer uses the product cost management model to calculate the changes in expected network profit when changing the maximum cycles at a factory from 80% to 120%. The actual values of the mean network profits for the scenario of Example 2 are those shown in TABLE 1, above. Risk management visualization system 110 uses a maximum variance exploration acquisition function to select data points that are evaluated for improving the fit of the surrogate model the actual values of the mean network profit.

As disclosed above, risk management visualization system 110 performs a method of Bayesian black box optimization by receiving the selected inputs (which is the percentage Max Cycles in this exemplary scenario), the kernel (which may be selected from RBF, Matern, the sum of RBF and Matern, etc.), and a confidence interval, which is explained in more detail below. Risk management visualization system 110 selects three data points of the sample input for initial exploration, which in this scenario are selected as the mean of the input variable (110%) and the minimum (80%) and maximum (120%) values of the input variable over the selected range (80%-120%). Solver 264 calculates the mean network profit (the KPI value) for each of the selected values of the input variable (80%, 110%, and 120%), and transmits the calculated values to risk management visualization system 110, 1059462.13, 3051801.12, and 3522568.72, respectively, as shown in TABLE 1. Using the calculated values, risk management visualization system 110 performs a Gaussian process fit for the selected kernel, as shown in FIGS. 7A-7C.

Figure 7A:
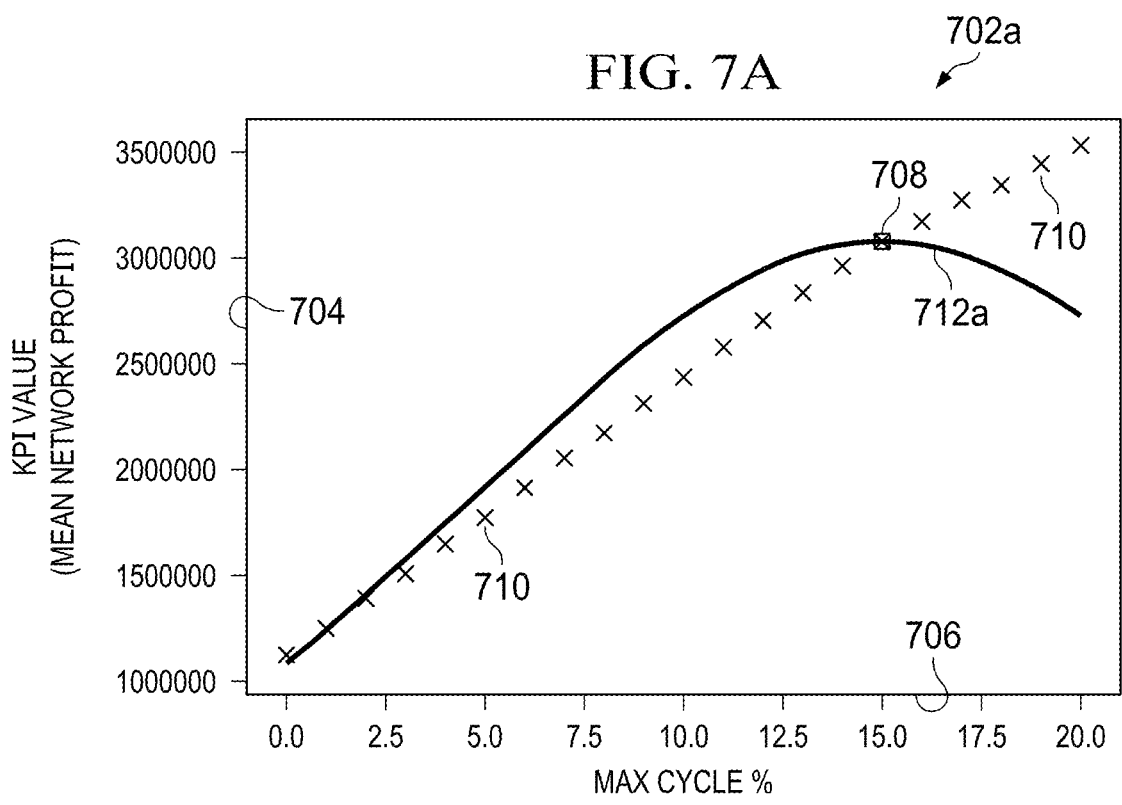
FIGS. 7A-7C illustrate plots of fitting a Gaussian process with initially selected data points, according to embodiments.
Figure 7B:
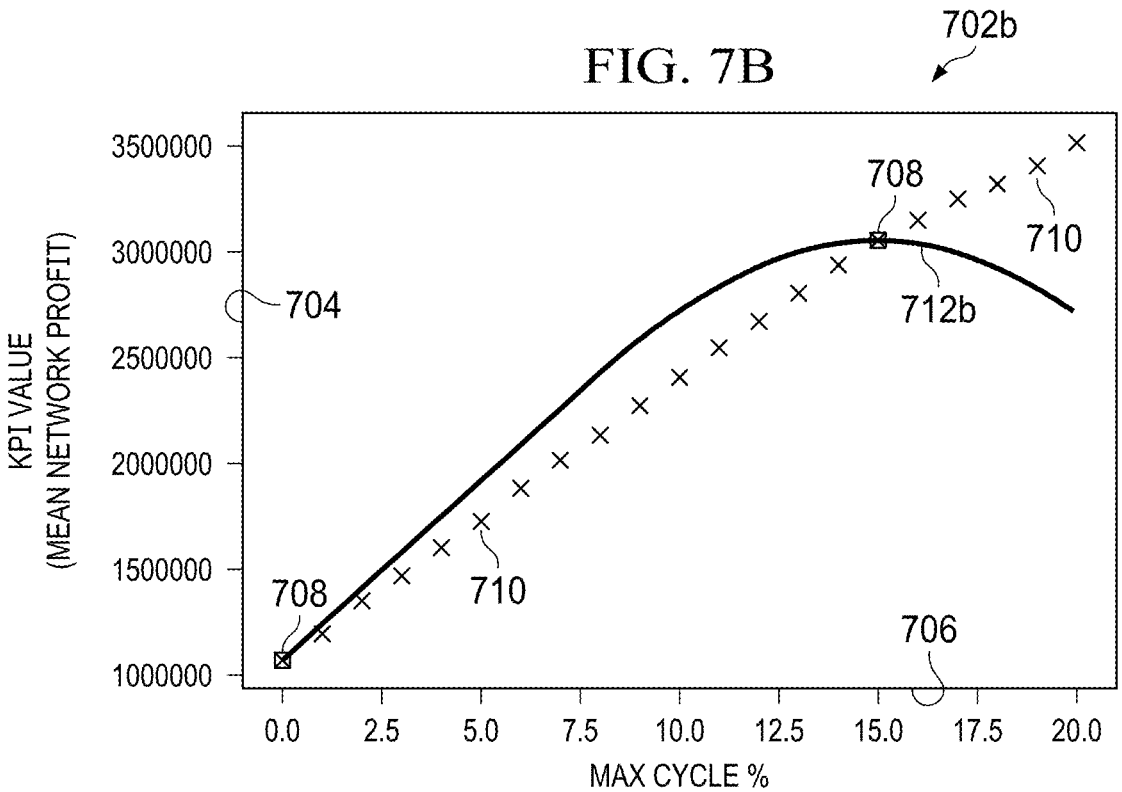
Figure 7C:
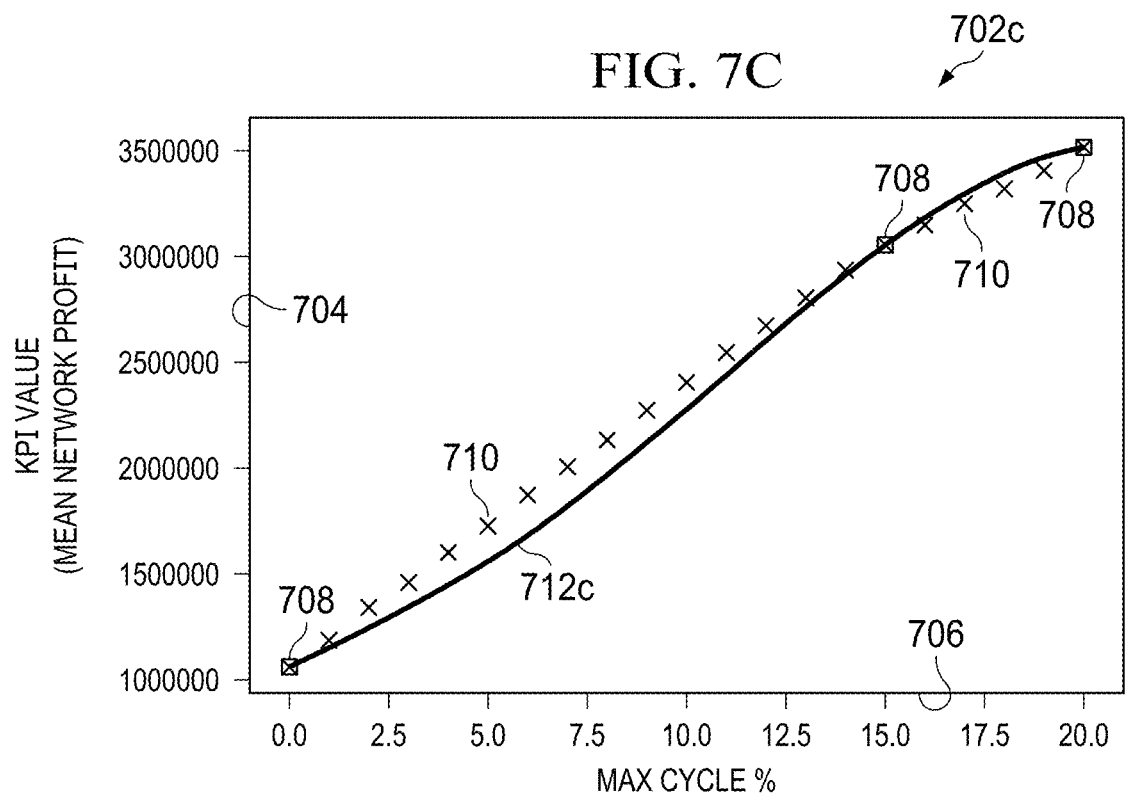

FIGS. 7A-7C illustrate plots 702a-702c of fitting the Gaussian process with the initially selected data points, according to embodiments. Plots 702a-702c comprise Y-axis illustrating KPI Value 604 and X-axis illustrating max cycle % 606. Squares 708 indicate the selected data points where risk management visualization system 110 has received the calculated network profit for a particular value of the input variable. X marks 710 indicate the surrogate model that is fit the selected data points. Gaussian process fits 712a-712c represent a Gaussian process fit to the evaluated data points. Although FIGS. 7A-7C illustrate plots 702a-702c in a particular configuration, embodiments contemplate risk management visualization system 110 generating plots 702a-702c, or other graphical plots, in any configuration, according to particular needs.

After fitting the initially selected data points and squares 708, risk management visualization system 110 calculates the mean and standard deviation of the KPI value for the unexplored input range. Using the predicted mean and standard deviation of the unexplored input range, risk management visualization system 110 begins learning phase 506 to fit the Gaussian model to data that was unexplored in exploration phase 504. According to embodiments, risk management visualization system 110 calculates the bounds of the KPI values based on the selected confidence interval above. These actions are explained in further detail below.

Continuing with learning phase 506 of the Bayesian black box optimization, risk management visualization system 110 uses the acquisition function to select new data points, given the exploited data points. As disclosed above, the acquisition function for this scenario is selected as the max variance exploration acquisition function. According to an embodiment, the max variance is calculated as the maximum of the variance of the predicted KPI at each input value.

Although the acquisition function is described as comprising a max variance exploration acquisition function, embodiments using other methods to explore new data points, such as, for example, finding input values with the highest uncertainty, finding input values with the highest derivative value, using a maximum probability of improvement (MPI), using an expected improvement (EI), using an upper confidence bound (UCB), selecting the most uncertain input using the mean and the standard deviation, identifying one or more of the most uncertain inputs using the mean and standard deviation, and identifying one or more of the most uncertain input using distance of the data points from other data points, and the value of the uncertainty of the KPI value in the unexplored area.

Figure 7D:
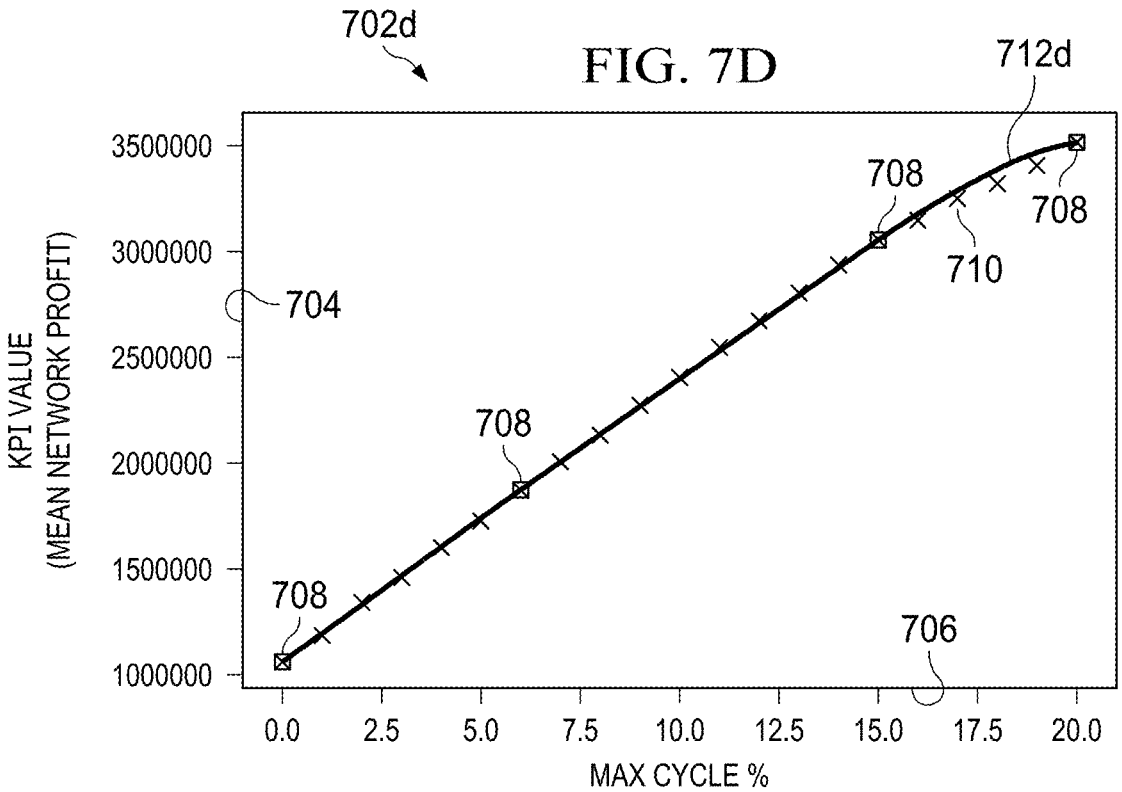
FIG. 7D illustrates a plot of fitting a Gaussian process using a data point selected using an acquisition function, according to an embodiment.

FIG. 7D illustrates plot 702d of fitting the Gaussian process using the data point selected using the acquisition function, according to an embodiment. Risk management visualization system 110 receives the mean network profit (1864649.12) for the value of the input variable identified by the max variance, which is 92%. At action 524 of learning phase 506, risk management visualization system 110 fits Gaussian model fit 712d with the calculated KPI value for the mean network profit. Next, risk management visualization system 110 checks for one or more stopping criteria. According to embodiments, the stopping criteria may comprise, for example, detecting a preselected desired accuracy of the mean, a preselected accuracy of the standard deviation, or a maximum number of iterations. When the stopping criteria are not met, risk management visualization system 110 explores new data points, and when the stopping criteria are met, method 500 ends.

Example 3: Gaussian Process Fit of a Production Facility with Input Variables with Stochastic Insights In this scenario, risk management visualization system 110 of a production facility evaluates the effect on expected mean network profit, which is the KPI, due to the variability of the percentage of open shifts (Open Shifts %), which is the random input variable. According to embodiments, open shifts are the number of shifts open at a given facility of one or more supply chain entities. In this example, risk management visualization system 110 calculates the expected profit based on the calculated variability of Open Shifts %, which is assumed to have a mean of 100 and a standard deviation of 5.

As disclosed above, risk management visualization system 110 performs one or more methods, including but not limited to method 500 of Bayesian black box optimization by receiving the selected inputs, the kernel, and a confidence interval. Here, the selected inputs are 95%, 100%, and 105% and the confidence interval is 99.9%.

TABLE 2

| Input Variable (Open Shifts %) | KPI Value (Mean Network Profit) |
|---|---|
| 90 | 58067265.99 |
| 91 | 58722071.70 |
| 92 | 58722071.70 |
| 93 | 59354028.64 |
| 94 | 59354028.64 |
| 95 | 59900736.37 |
| 96 | 59900736.37 |
| 97 | 60429454.80 |
| 98 | 60429454.80 |
| 99 | 60943208.45 |
| 100 | 60943208.45 |
| 101 | 60943208.45 |
| 102 | 60943208.45 |
| 103 | 60943208.45 |
| 104 | 60943208.45 |
| 105 | 60943208.45 |
| 106 | 60943208.45 |
| 107 | 60943208.45 |
| 108 | 60943208.45 |
| 109 | 60943208.45 |
| 110 | 60943208.45 |

TABLE 2 illustrates exemplary data points for mean network profit at various values of Open Shift %, according to an embodiment. The KPI value, which here, is the mean network profit, is shown for selected percentages of change of the open shifts, the input variable, from 90% to 110% at each 1% interval.

Continuing in this example with the actions of method 500, risk management visualization system 110 receives the calculated mean network profit for the selected initial values of the input variables. Using the calculated mean network profit, risk management visualization system 110 performs a Gaussian process fit to model the probable value of the mean network profit due to the variability of Open Shifts % between the calculated values.

Figure 8A:
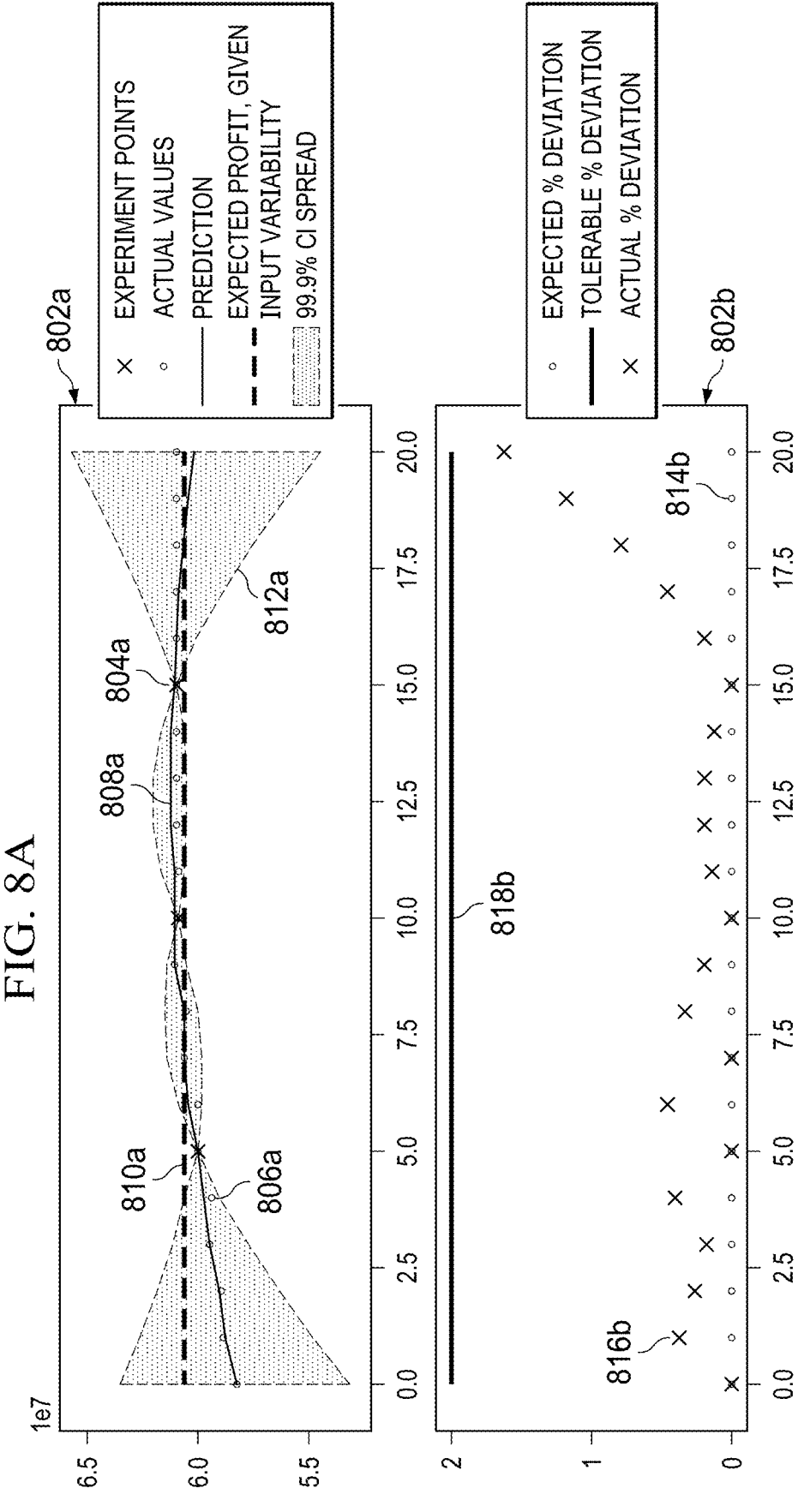
FIG. 8A illustrates exemplary plots that show the stochastic nature of the mean network profits and the deviation from actual values, according to an embodiment.

FIG. 8A illustrates exemplary plots 802a and 802b that show the stochastic nature of the mean network profits and the deviation from actual values, according to an embodiment. Plot 802a illustrates the calculated mean network profit values received from solver 264 (experiment points 804a), the actual mean network profits of the underlying data (actual values 806a), and the predicted values based on the fit of the Gaussian processes (prediction 808a) for a range of values (90%-110%) of the input variable at 1% increments, as disclosed above.

Also plotted on this graph is the mean network value that is expected based on the variability of the Open Shifts %. This is referred to as expected profit 810a, which in the exemplary scenario of Example 3, is 60362316.995566435, represented by a line at this value across all input variables. In addition, the graph further comprises the range of possible values of the mean network profit within a 99.9% confidence interval (99.9% CI Spread 812a).

Plot 802b illustrates the percent deviation (from 0% to 2%) between the predicted expected profit 814b and the actual value of the expected profit 816b calculated form the underlying model data. A deviation tolerance (tolerable % deviation 818b) is also illustrated as a line at 2% deviation across all values of the input variable.

Risk management visualization system 110 calculates the mean and standard deviation of the mean network profit for the unexplored input range as an output of the Gaussian process model. According to an embodiment, risk management visualization system 110 executes a python script that performs the Gaussian process fit.

Using the predicted mean and standard deviation of the mean network profit for the unexplored input range, risk management visualization system 110 fits the Gaussian process to the unexplored data based on the known data points. Risk management visualization system 110 also displays confidence intervals above and below the mean for the unexplored data based on the selected confidence interval, which in this example is 99.9%, as disclosed above. According to embodiments, risk management visualization system 110 calculates the confidence interval based on the determined standard deviation for the unexplored data. At action 518, risk management visualization system 110 calculates the upper and lower bounds of the KPI value as the boundary of the confidence interval above and below the predicted mean. These boundaries contain the range of KPI values (here, network profit) that are predicted to occur at the corresponding value of the Open Shifts %. Continuing with learning phase 506 of method 500, risk management visualization system 110 uses the acquisition function to select new data points, given the known data points, as disclosed above.

Figure 8B:
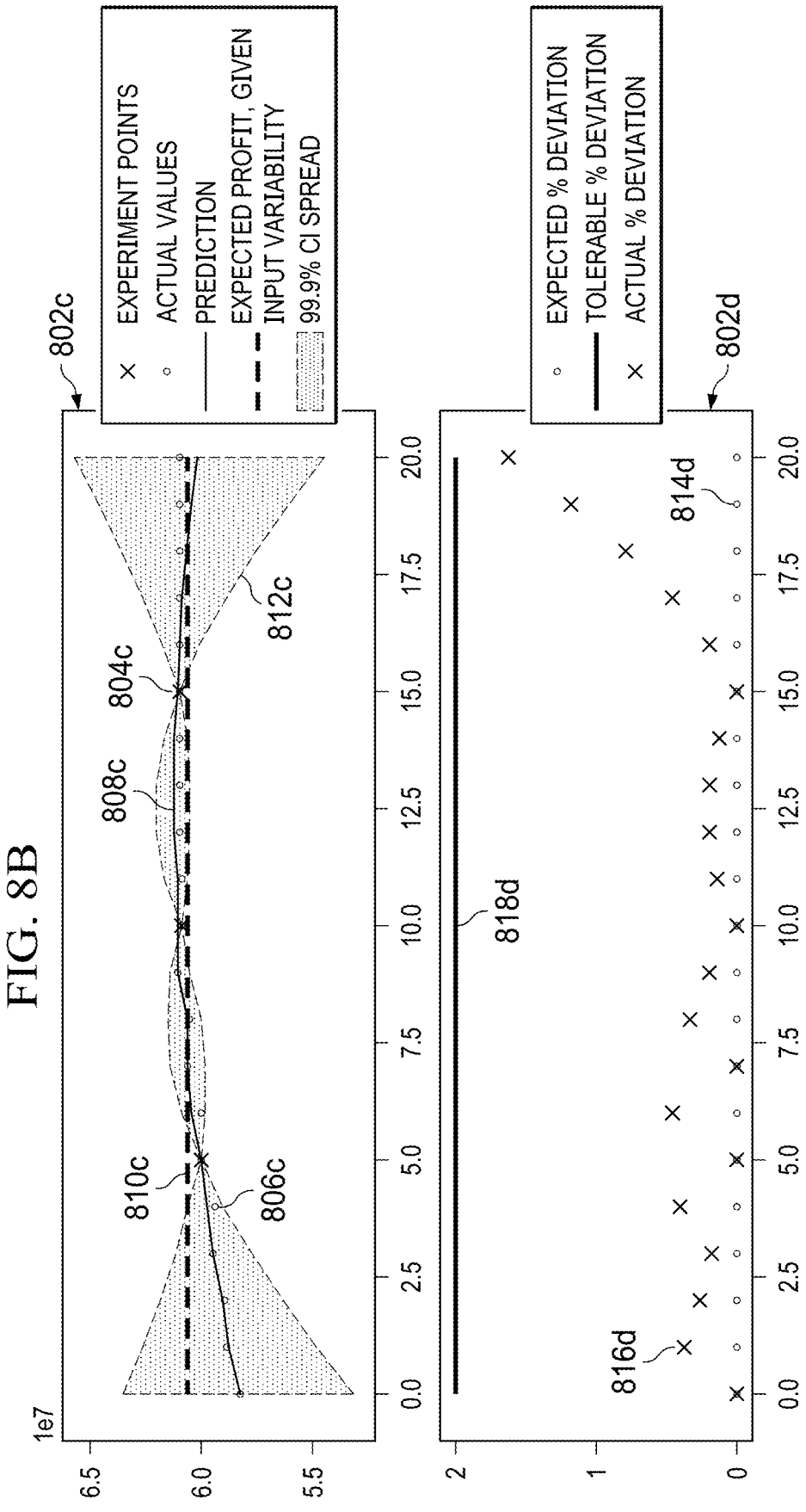
FIG. 8B illustrates exemplary plots that show the stochastic nature of the mean network profits and the deviation from actual values after fitting additional data points, according to an embodiment.

FIG. 8B illustrates exemplary plots 802c and 802d that show the stochastic nature of the mean network profits and the deviation from actual values after fitting additional data points, according to an embodiment. Plot 802c illustrates the calculated mean network profit values received from solver 264 (experiment points 804c), the actual mean network profits of the underlying data (actual values 806c), and the predicted values based on the fit of the Gaussian processes (prediction 808c) for a range of values (90%-110%) of the input variable at 1% increments, as disclosed above.

Also plotted on this graph is the mean network value that is expected based on the variability of the Open Shifts %. This is referred to as expected profit 810c, which in the exemplary scenario of Example 3, is 60362316.995566435, represented by a line at this value across all input variables. In addition, the graph further comprises the range of possible values of the mean network profit within a 99.9% confidence interval (99.9% CI Spread 812c).

Plot 802d illustrates the percent deviation (from 0% to 2%) between the predicted expected profit 814d and the actual value of the expected profit 816d calculated form the underlying model data. A deviation tolerance (tolerable % deviation 818d) is also illustrated as a line at 2% deviation across all values of the input variable. As disclosed above, risk management visualization system 110 checks for one or more stopping criteria and iteratively refines the surrogate model until one or more stopping criteria are detected.

According to embodiments, after completing the Bayesian Optimization with the Gaussian process fit, risk management visualization system 110 calculates and displays one or more of the following: risk profile, most influencing input variables, feasible range of input variables, and optimal inputs. Methods for calculating the risk profile, most influencing input variables, feasible range of input variables, and optimal inputs are described in further detail below.

Figure 9:
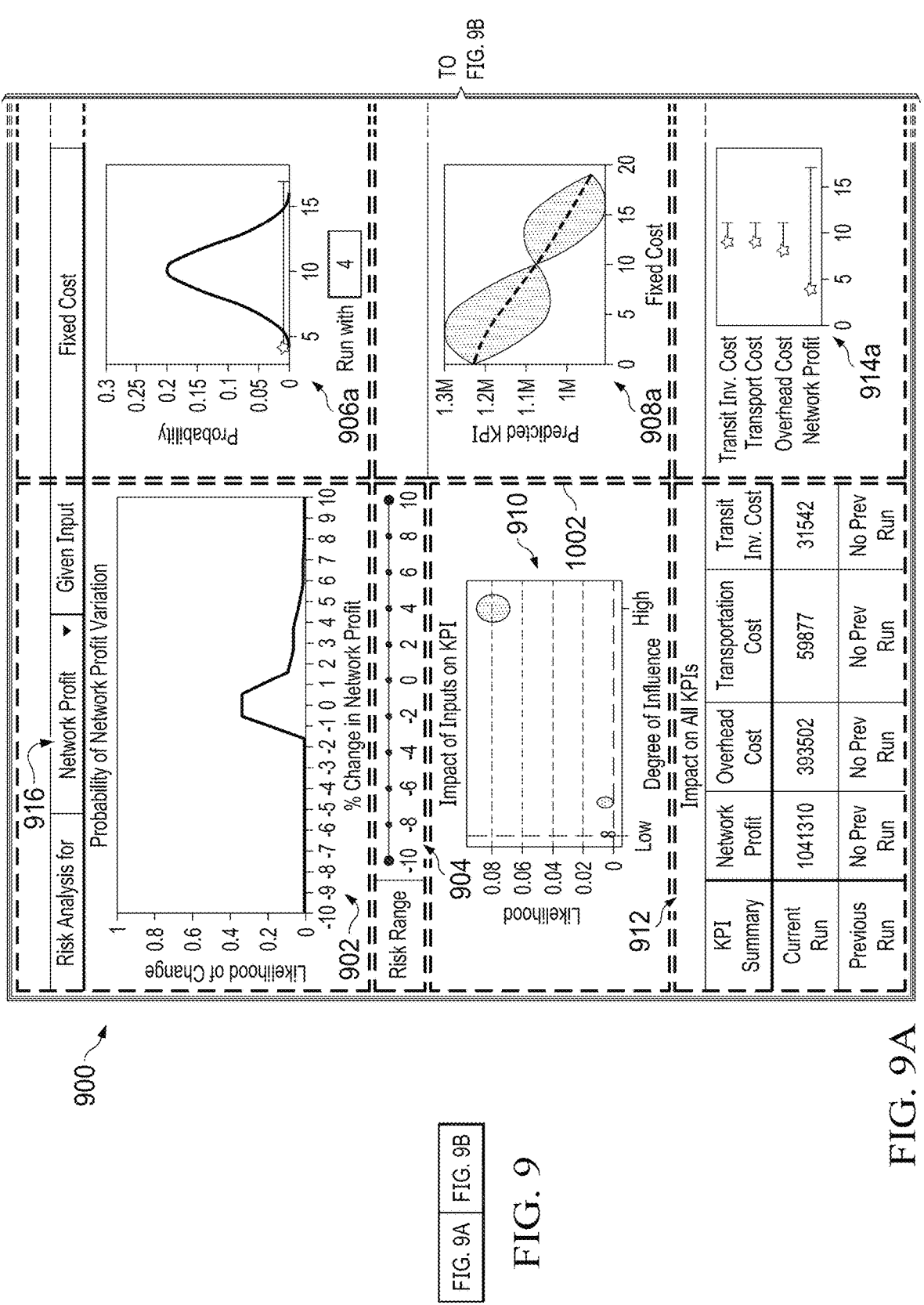
FIGS. 9A-9B illustrate a risk management dashboard, according to an embodiment.
Figures 9A, 9B:
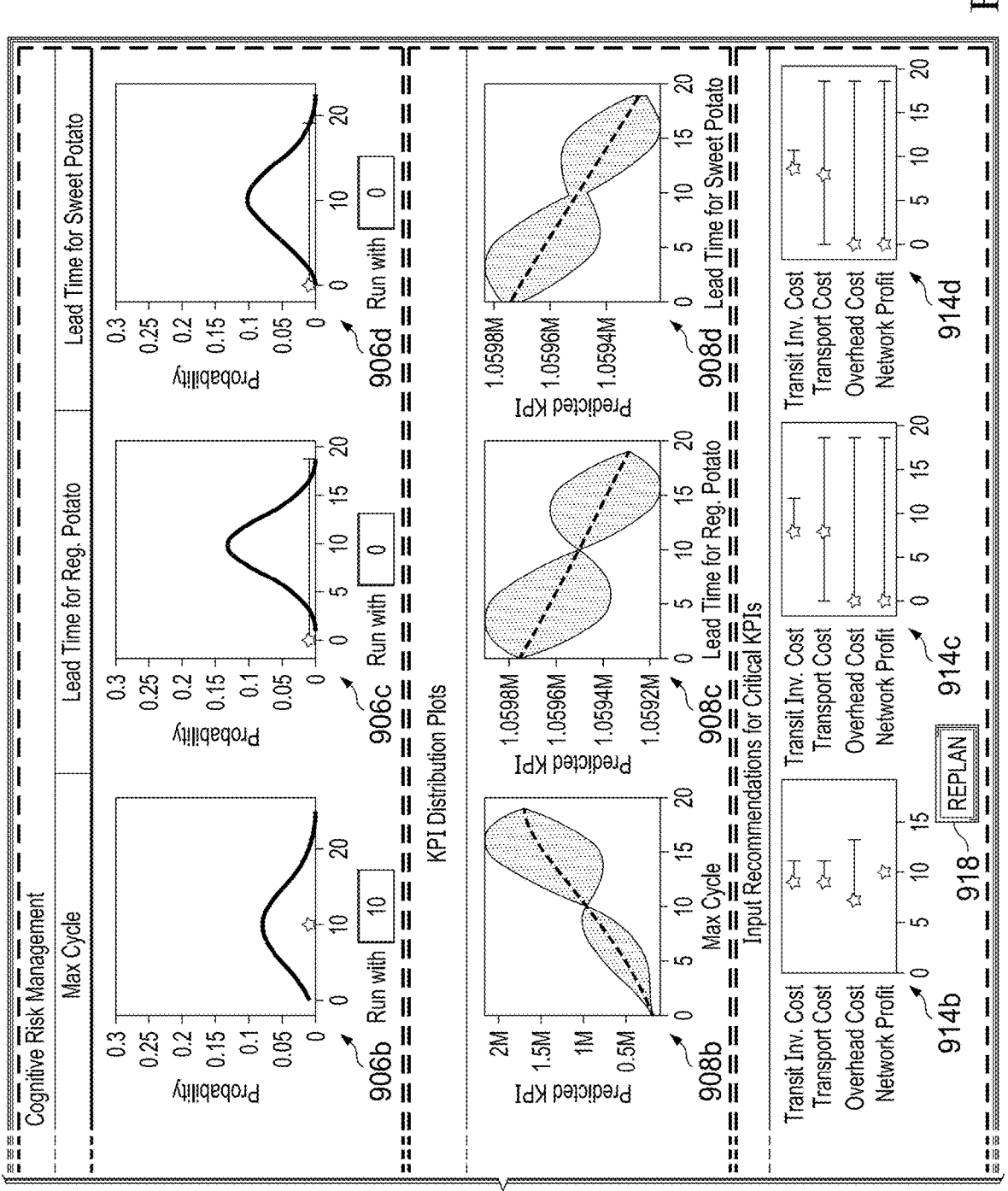

FIGS. 9A-9B illustrate risk management dashboard 900, according to an embodiment. Risk management dashboard 900 comprises visualizations and interactive elements for profiling and managing risk of supply chain plans. As disclosed above, risk management dashboard 900 displays visualizations that profile the risk that one or more KPIs will change within a selectable range of acceptable risk based on the variability of values for various input variables. In addition, interactive elements provide for selecting particular one or more KPIs to analyze, values for input variables, and a range of acceptable risk. In response to the selections, risk management dashboard 900 updates a display of the risk profile, which may include, but is not limited to:

the variability, feasible range, and optimal value of the input variables;

the variability, optimal value, and likelihood of change of a KPI;

the inputs having the greatest influence on a KPI value; and the risk that a KPI will deviate from the current value.

In one embodiment, risk management dashboard 900 comprises KPI risk chart 902, risk range selector 904, input distribution charts 906a-906d, KPI distribution charts 908a-908d, input impact visualization 910, KPI impact visualization 912, input recommendation visualizations 914a-914d, risk analysis selector 916, and replan button 918. As disclosed above, risk management dashboard 900 may display visualizations for the expected values for four KPIs (Transit Inv. Cost, Transport Cost, Overhead Cost, and Network Profit) based on the calculated Bayesian optimization of the following input variables: Fixed Costs, MaxCycle, lead time for Item 1 (Regular Potato), and lead time for Item 2 (Sweet Potatoes). Continuing with this example, KPI risk chart 902 displays risk for a network profit KPI. In response to selection of a different KPI using risk analysis selector 916, such as, for example, overhead cost, transportation cost, and transit inv. costs, risk management visualization system 110 automatically updates the visualizations of risk management dashboard 900 to show the data for the selected KPI. Risk range selector 904 provides an interactive visual element for adjusting range of acceptable risk for the selected KPI, as described in further detail below, in response to modification of a risk range by risk range selector 904, risk management visualization system 110 updates KPI risk chart 902 based on the selected risk range.

Input distribution charts 906a-906d comprise the modeling of the distribution of values for each four input variables: Fixed Costs, MaxCycle, lead time for Item 1, and lead time for Item 2. Although lead time input variables for the first and second item indicate the lead time for a particular item, input distribution charts 906a-906d are calculated at a granularity of the model. By way of example only and not by way of limitation, if the input values (or their variability parameters, such as, for example, the mean and standard deviation) are known for items only at the product group level, risk management dashboard 900 may display the risk profile and the input variability according to the product group. In the illustrated example, the MaxCycle is set at the plan level, and the lead times are set at the item level. However, embodiments contemplate input variables comprising any grouping or granularity (such as, for example, plan level, product group level, item level, SKU level, and the like), according to particular needs.

KPI distribution charts 908a-908d comprise KPI values are calculated for the given inputs for a value ranging from 0 to 20. For example, assuming the lead time varies from 0 to 20 days, KPI distribution charts 908a-908d display the calculated mean for the KPI at each lead time, and a range of KPI values that are predicted to occur based on a particular lead time for a predetermined confidence interval. Input impact visualization 910, KPI impact visualization 912, and input recommendation visualizations 914a-914d provide display the risk of the selected KPI as well as the influence, variability, range of feasible values, and optimal values of the input variables.

Risk Profile

According to one embodiment, the risk profile comprises a visualization of the risk that the KPI value will change from the predicted value. As described in further detail below, the risk profile visualization may be configured to display the risk of the expected KPI value as well as one or more risks of other KPI values based, at least in part, on modelling adjustments to the variability of the input variables. According to embodiments, risk management visualization system 110 calculates the risk profile for each KPI and each input variable range.

Figure 10:
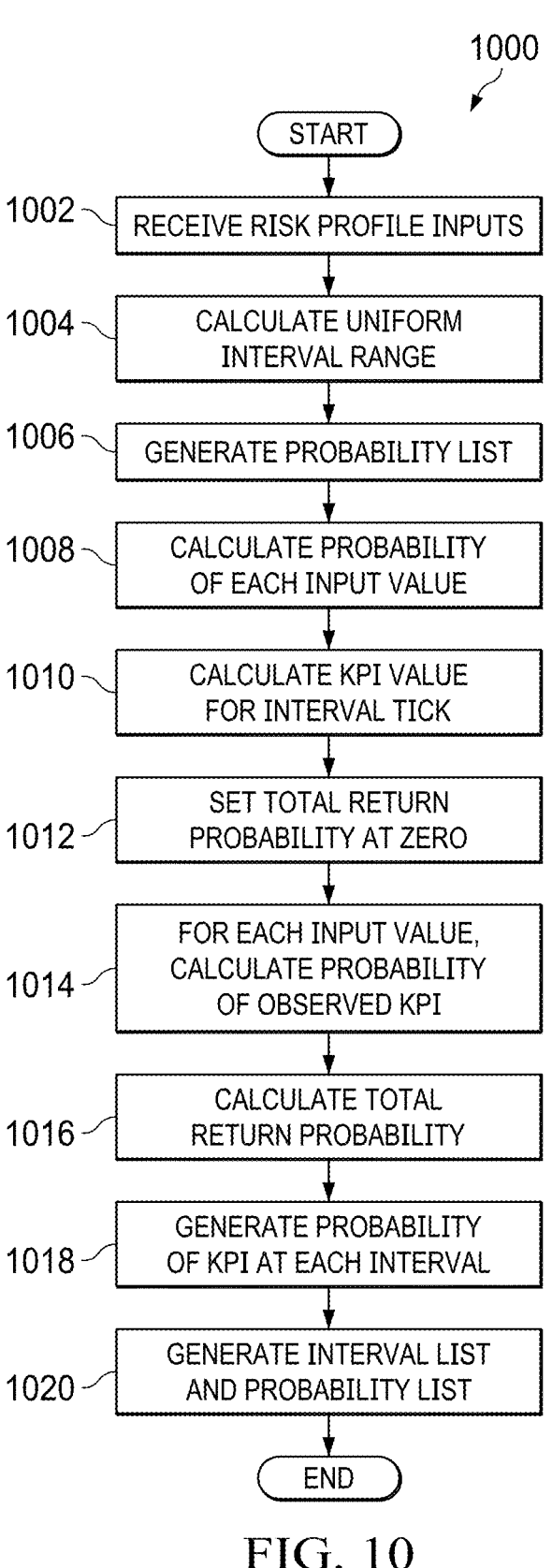
FIG. 10 illustrates a method of generating an interval list and a probability list based on one input variable, according to an embodiment.

FIG. 10 illustrates method 1000 of generating the interval list and the probability list based on one input variable, according to an embodiment. Method 1000 proceeds by one or more actions, which although described in a particular order, may be performed in one or more permutations, according to particular needs.

Method 1000 begins when risk management visualization system 110 receives the risk profile inputs at action 1002. According to one embodiment, the risk profile inputs comprise the input range, the corresponding predicted KPI, the predicted standard deviation, the base KPI, the risk range (i.e. the lower range value and the upper range value), and the quantity of tick intervals. At action 1004, risk management visualization system 110 calculates the uniform interval range by dividing the length between the lower range value and the upper range value into equal intervals. In one embodiment, risk management visualization system 110 stores the uniform interval range as the interval list.

Risk management visualization system 110 at action 1006 generates a probability list, using a list of the uniform intervals. At action 1008, risk management visualization system 110 calculates the probability of each input value (x). In one embodiment, the probability of each input value is obtained by risk management visualization system 110 using a Gaussian probability density function.

At action 1010, risk management visualization system 110 calculates KPI value for each interval tick by, for example, calculating the KPI value for the given tick by: base KPI*(1+tick/100))–observed KPI. Risk management visualization system 110 sets the total return probability at zero, at action 1012.

For each input value, risk management visualization system 110 calculates the probability of the observed KPI at action 1014 using the mean and standard deviation at the input. For example, when the probability of the KPI is less than the observed KPI, risk management visualization system 110 calculates the probability as 0, when the observed KPI is greater than the mean at the input and, otherwise, calculates the probability as 1. When the probability of the KPI is greater than the observed KPI, risk management visualization system 110 calculates the probability as the cumulative distribution function value of the observed KPI with Gaussian (mean at input, standard deviation at input.

At action 1016, risk management visualization system 110 calculates the total return probability, wherein the total return probability is calculated according to (probability of input*probability of observed KPI) wherein the probability of the input is the probability of the value of input variable.

At action 1018, risk management visualization system 110 generates the probability of KPI at each interval, wherein the probability is equal to the total return probability divided by the sum of the input probabilities. At action 1020, risk management visualization system 110 generates the interval list and the probability list, which as shown below, are used to generate the risk profile visualization.

FIG. 11 illustrates generating a risk profile visualization, according to an embodiment. Method 1100 proceeds by one or more actions, which although described in a particular order, may be performed in one or more permutations, according to particular needs.

Risk management visualization system 110 calculates the interval list and joint likelihood list for each KPI using the interval list and probability list for each input variable. At action 1102 risk management visualization system 110 receives the interval list and probability list for each input variable. For example, risk management visualization system 110 receives, and/or generates using method 1100 of FIG. 10, above, the interval list and the probability list for of the input variables, such as, for example, each of Max Cycles, Lead Time for Item 1, Lead Time for Item 2, Open Shifts %, and the like.

At action 1104, risk management visualization system 110 initializes a joint probability list by creating a list with each interval as a list with all ones for the size of the selected interval. At action 1106, for each interval in the interval list, risk management visualization system 110 calculates the joint probability for all input variables at that interval by multiplying the calculated probability of the KPI at the interval, and then adding the calculated joint probability to the correct interval on the list.

At action 1108, risk management visualization system 110 normalizes the joint probability list so the sum of all probabilities is equal to 1. At action 1110, risk management visualization system 110 computes the probability density function values for the joint probability list to add to a joint likelihood list, wherein, each value of the joint likelihood list is equal to $(y_i - y_{i-1})/(x_i - x_{i-1})$ for $i=1, 2, \ldots n$, for each $y_0$=value of the joint probability list at point 0, and $x_0$=value of the interval list at point 0.

At action 1112, risk management visualization system 110 normalizes the joint likelihood list to restrict values to between 0 and 1, and at action 1114, risk management visualization system 110 appends the calculated values to the joint likelihood list and generates an output comprising, for each interval on the list, the joint likelihood. At action 1116, risk management visualization system 110 generates the risk profile visualization, as described in further detail below.

Risk Profile for One Input Variable:

```
Input: Computed data points (x_i, y_i, sigma_y_i) for i=1,2,3,...,n. base
KPI, Base_y = average of the KPI values of the different input values
  Output: Computation of Likelihood of KPI falling by k% to the Base
  KPI, Base_y.
  Activity1: Compute Prob(KPI <= k% of BaseKPI); Here KPI is random
variable
```

-continued

```
  Activity2: Compute a list, input_prob s = [Prob(input ≈x_i) for all
i=1,2,3,...,n] here input is RV and x_i is predicted input.
  Activity3: set total_return_prob = 0.
    for each x in [x_1,x_2,x_3,...,x_n]
      probability_of_at_least_uptick =
    probability_of_KPI_equals_to_y(y_i, sigma_y_y, k%of BaseKPI)
      total_return_prob += (prob_of_input *
    probability_of_at_least_uptick)
    Prob(PKI <= k%of BaseKPI) = total_return_prob/sum(input_probs)
  Computation: probability_of_KPI_equals_to_y(mean, sigma, y)
  if(sigma == 0):
    if(y >= mean):
      return 1
    else:
      return 0
  kpi_dist = stats.norm(mean, sigma)
  Output : kpi_dist.pdf(y)
```

According to embodiments, risk management visualization system 110 may use the pseudocode provided above for calculating a risk profile for one input variable, according to an embodiment. The pseudocode for calculating a risk profile for one input variable illustrates implementing a particular embodiment of one or more methods described herein by one or more actions, which although described in a particular order, may be performed in one or more permutations, as disclosed above, according to particular needs. Risk Profile for More than One Input Variable:

```
Here for each input variable x in X
Compute probability_of_at_least_uptick and average it an then compute
Prob(KPI <= k%of BaseKPI)
```

According to embodiments, risk management visualization system 110 may use the pseudocode provided above for calculating a risk profile for more than one input variable (including, but not limited to, joint input variables), according to an embodiment. The pseudocode for calculating a risk profile for more than one input variable illustrates implementing a particular embodiment of one or more methods described herein by one or more actions, which although described in a particular order, may be performed in one or more permutations, as disclosed above, according to particular needs.

Example 4: Gaussian Process Fit of Potato Chip Production with Open Shift Analysis: Mean 100, Standard Deviation 5

TABLE 3

| | |
|---|---|
| Max Iteration Count | 3 |
| Current Iteration | [0] |
| Assumed Input Mean | 100 |
| Assumed Input Standard Deviation | 5 |
| KPI Uptick Percentage | 5 |
| KPI Downtick Percentage | 5 |
| KPI Tick Intervals | 100 |
| Starting Input Value For $X_0$ | 90 |
| KPI Being Tested | Network Profit |
| Input Being Tested | Open Shifts |

The maximum iteration count (Max Iteration Count) is the maximum number of iterations risk management visualization system 110 will perform. The current iteration (Current Iteration) is the iteration from which the risk analysis is beginning. When the current iteration is zero, it means no previous iterations have been performed. The mean assumed input (Assumed Input mean) is the calculated or known value of the mean for the input being tested.

The standard deviation of the assumed input (Assumed Input standard deviation) is the calculated or known value of the standard deviation for the input being tested. The percentage for the KPI uptick and the KPI downtick (KPI Uptick Percentage) and (KPI Downtick Percentage) is the range of the percentage changes above and below the base KPI for which the risk of the KPI will be calculated. (e.g. when the KPI uptick percentage=2 and KPI downtick percentage=4, risk management visualization system 110 calculates the likelihood of change in the KPI from a four percentage drop from the base KPI to a two percentage increase over the base KPI.)

The number of KPI tick intervals (KPI Tick Intervals) is the number of equal intervals that risk management visualization system 110 will divide the range between the KPI uptick percentage and the KPI downtick percentage. The initial value for x (Starting Input Value For X) is the lowest value of the input variable that is calculated. The KPI (KPI Being Tested) is the name of the KPI being tested. The tested input (Input Being Tested) is the name of the input variable being tested.

The mean network profit received from solver 264 may comprise the following values form TABLE 4.

TABLE 4

| Input Variable (Open Shifts %) | KPI Value (Mean Network Profit) |
|---|---|
| 90 | 58067265.99 |
| 91 | 58722071.70 |
| 92 | 58722071.70 |
| 93 | 59354028.64 |
| 94 | 59354028.64 |
| 95 | 59900736.37 |
| 96 | 59900736.37 |
| 97 | 60429454.80 |
| 98 | 60429454.80 |
| 99 | 60943208.45 |
| 100 | 60943208.45 |
| 101 | 60943208.45 |
| 102 | 60943208.45 |
| 103 | 60943208.45 |
| 104 | 60943208.45 |
| 105 | 60943208.45 |
| 106 | 60943208.45 |
| 107 | 60943208.45 |
| 108 | 60943208.45 |
| 109 | 60943208.45 |
| 110 | 60943208.45 |

TABLE 4 provides the mean network profit at various open shifts percentages, according to an embodiment.

Base Value of Network Profit: 60943208.45 According to embodiments, the base value of network profit is the KPI value at the mean input value (i.e. when the network profit at input=100). The base value may be received from solver 264.

Expected Value of KPI, given the input variability 60544857.62255012. According to embodiments, the expected value of the network profit is the KPI value calculated according to: sum (probability of input*predicted KPI value for the input), for all inputs. Risk management visualization system 110 may determine the probability of the input from historical data and/or, using Gaussian distribution.

Figure 12:
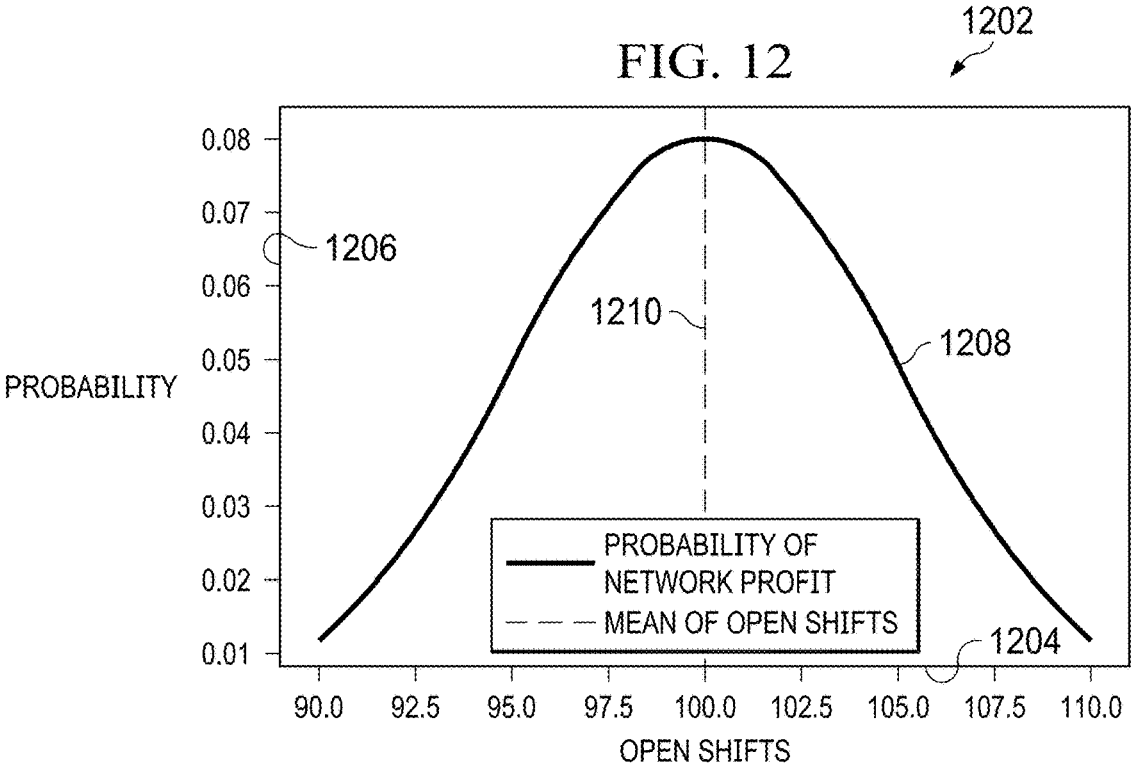
FIG. 12 illustrates a graph displaying the input distribution of Open Shifts %, in accordance with an embodiment.

FIG. 12 illustrates graph 1202 displaying the input distribution of Open Shifts %, in accordance with an embodiment. Graph 1202 comprises Open Shifts X-axis 1204, Probability Y-axis 1206, probability of network profit 1208, and mean value of Open Shifts 1210. Although FIG. 12 illustrates an input distribution of Open Shifts % in a particular configuration, embodiments contemplate risk management visualization system 110 generating and displaying graphs 1202 in any configuration and displaying any data, according to particular needs.

Graph 1202 illustrates the input distribution of the Open Shifts % when the assumed or given mean of this input variable is 100% and the standard deviation is five. Based on the inputs above, risk management visualization system 110 calculates the predicted KPI values based on the variability and confidence interval the input variable.

Figure 13:
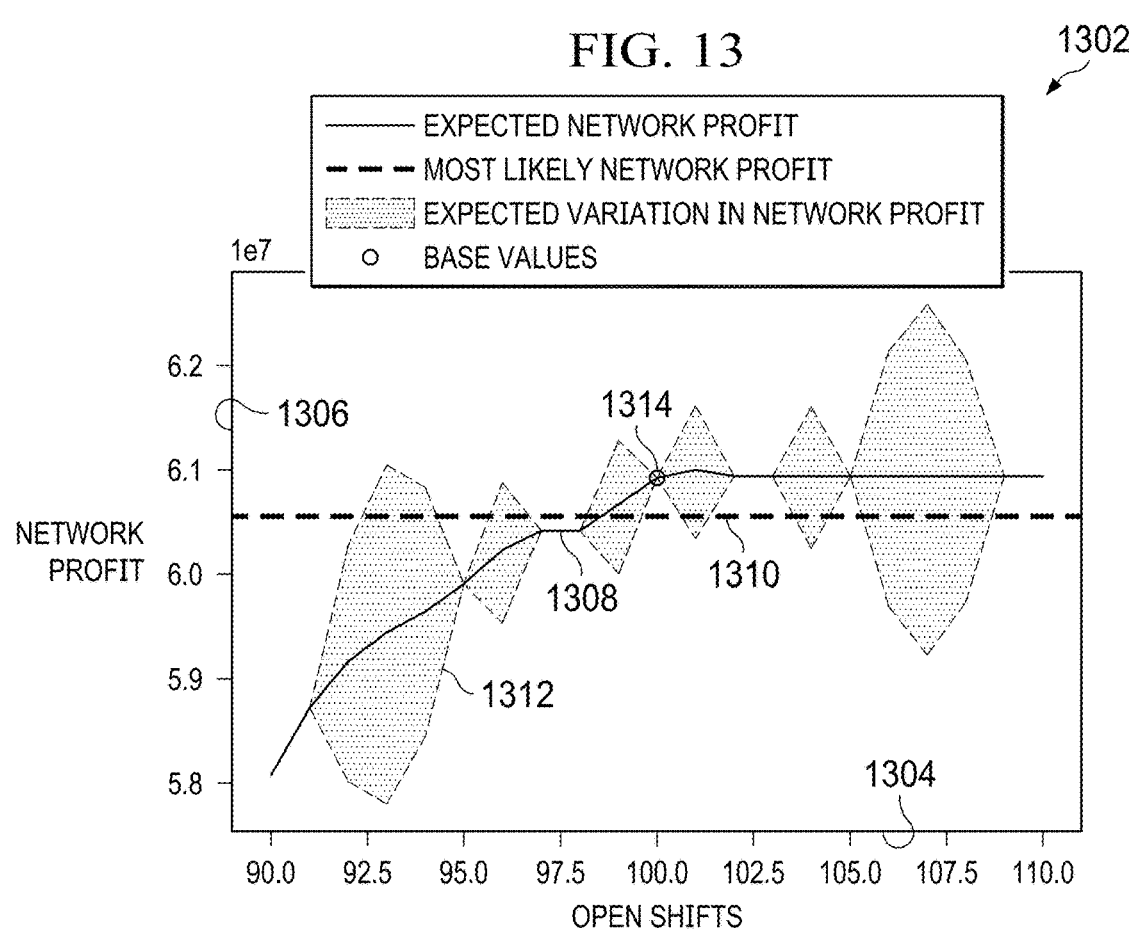
FIG. 13 illustrates a graph depicting the predicted KPI values based on the variability and confidence interval for each of the input variables, according to an embodiment.

FIG. 13 illustrates graph 1302 depicting the predicted KPI values based on the variability and confidence interval for each of the input variables. Graph 1302 comprises Open Shifts X-axis 1304, Network Profit Y-axis 1306, expected network profit 1308, most likely network profit 1310, expected variation in network profit 1312, and base value 1314. Although FIG. 13 illustrates the predicted KPI values based on the variability and confidence interval for each of the input variables in a particular configuration, embodiments contemplate risk management visualization system 110 generating and displaying graphs 1302 in any configuration and displaying any data, according to particular needs.

According to one embodiment, risk management visualization system 110 calculates the risk profile using the predicted KPI values based on the variability and confidence interval, illustrated above, as well as the other risk profile inputs, which comprise the input range, the predicted standard deviation, the base KPI, the risk range (i.e. the lower range value and the upper range value), and the quantity of tick intervals.

FIG. 14 illustrates risk profile graph 1402, according to an embodiment. Risk profile graph 1402 comprises % Change in Network Profit X-axis 1404, Likelihood of Change Y-axis 1406, and probability of profit variation 1408. Although FIG. 14 illustrates risk profile graph 1402 in a particular configuration, embodiments contemplate risk management visualization system 110 generating and displaying risk profile graphs 1402 in any configuration and displaying any data, according to particular needs.

In an embodiment, risk profile graph 1402 illustrates the likelihood of a change in the KPI value (by percentage) at each tick in the selected risk range (as illustrated in FIG. 14, from a 5% decrease in network profit to a 5% increase in network profit).

Optimal Inputs

As disclosed above, identify the inputs that provide the maximum or minimum KPI value based on, for example, whether the objective (e.g. an objective function of a supply chain planning problem modeled as a linear programming problem) is maximization of the KPI or minimization of the KPI.

If the objective is maximization, risk management visualization system 110 identifies the location of max KPI value, and the optimal input is the value of the input variable that gives the max KPI value. If the objective is minimization, risk management visualization system 110 identifies the location of the min KPI value, and the optimal input is the value of the input variable that gives the min KPI value.

Risk management visualization system 110 displays the optimal input for each variable in the visualization dashboard as a star placed the orange bars representing the range of feasible values for the input variables.

```
I/P - predicted_kpi_values, input_values, objective type
(minimize/maximize)
O/P - optimal_input_value
Algorithm
    - If maximize
    Get the location of max kpi value - max_kpi_loc
    Optimal_input = input value at index max_kpi_loc
    - Else:
    Get the location of min kpi value - min_kpi_loc
    Optimal_input = input value at index min_kpi_loc
        - Return optimal_input
```

According to embodiments, risk management visualization system 110 may use the pseudocode provided above for calculating the optimal inputs, according to an embodiment. The pseudocode for calculating the optimal inputs illustrates implementing a particular embodiment of one or more methods described herein by one or more actions, which although described in a particular order, may be performed in one or more permutations, as disclosed above, according to particular needs.

Most Influencing Input Among the More than One Input Variable:

When the risk profile indicates that the current profile is high risk, the risk may be lowered by adjusting one of the input variables. Because many input variables affect the KPI, adjusting each is not possible because, among other things, it is too computationally expensive. Risk management visualization system 110 generates a most influential inputs visualization that displays metrics which indicate the input variables that, when adjusted, have the greatest improvement to the risk profile. According to embodiments, the most influential inputs visualization comprise the influence of the input value on the KPI value, the uncertainty of the input value, and the likelihood of the input value.

FIG. 15 illustrates method 1500 of generating a degree of influence visualization, according to an embodiment. Method 1500 proceeds by one or more actions, which although described in a particular order, may be performed in one or more permutations, according to particular needs.

Method 1500 begins, at action 1502, with risk management visualization system 110 receiving the selected KPIs and selected input variables, from one or more locations local to, or remote from, risk management visualization system 110. In addition, or as an alternative, at action 1502, risk management visualization system 110 generates an array, a matrix, a list, or another data structure that indicates the selected KPIs and selected input variables. In one embodiment, action 1504 comprises, for a selected KPI and for each input variable, risk management visualization system 110 calculating the degree of influence as the derivative of the predicted KPI value at the optimal input value (the calculation of the optimal input value is described, below) for a feasible input range (also, the calculation of the feasible input range is described below). A steeper slope indicates a higher degree of influence and a shallower slope indicates a lesser degree of influence. In addition, or as an alternative, risk management visualization system 110 may calculate the derivative by:

1. When the optimal input value is equal to the first value in the input values range, then the derivative is equal to the predicted KPI values at the first k % after the optimal value minus the predicted KPI values at the optimal value;

2. When the optimal input is equal to the last value in input values range, then the derivative is equal to the predicted KPI values [−1]−predicted KPI values [−2] wherein, [−1] indicates the predicted KPI value for the last input value from the range (here, the KPI value at input=20, for the input range 0 to 20) and [−2] represents a second to last KPI value.

3. When the optimal input is not equal to the first value or the last value of the input values range, then the derivative is equal to the predicted KPI values at the first k % after the optimal value minus the predicted KPI values at the optimal value.

At action 1506, risk management visualization system 110 calculates the probability of the input variable at the optimal input based, at least in part on, the input mean, and the input standard deviation. In addition, or as an alternative, risk management visualization system 110 calculates the probability by taking the difference of the cumulative distribution function calculated from the Gaussian distribution represented by the mean and standard deviation of the input variable at the optimal input subtracting the cumulative distribution function calculated from the Gaussian distribution having the mean and standard deviation of input variable at the optimal input+1, wherein the optimal input+1 is the index of the input value which is next to the optimal input.

At action 1508, risk management visualization system 110 calculates the radius of the bubble (circular icon displayed on the visualization) based, at least in part, on the standard deviation of the KPI values for the input variable. In addition, or as an alternative, the radius is calculated as the radius of the bubble shown in the dashboard for degree of influence chart. Risk management visualization system 110 generates the most influencing input visualization at action 1510. The visualization dashboard may comprise a degree of influence visualization, according to an embodiment. The most influencing input visualization displays the most influencing inputs, which are the input variables having the greatest effect on the risk profile of the KPI. The degree of influence chart plots the likelihood that the current input value will occur based on historical data (y-axis) against the degree of influence of the input on the KPI value (x-axis). The size of the plotted bubble shows the variability in the range of the input value (i.e. variance).

Based on the identification of the input variable having the greatest influence on the predicted KPI value, risk management visualization system 110, and/or a supply chain planner, may modify the value of the input variable to determine if the risk may be decreased. In an embodiment, risk management visualization system 110 may provide an interactive element of a visualization dashboard, and/or risk management dashboard 900, to receive a modification of the input value. For example, in an embodiment, a visualization dashboard comprises input value entry boxes. According to one embodiment, risk management visualization system 110 sets the initial value displayed in the input value entry boxes to the value that provides the best KPI value.

```
Input: optimalPoint, x_pred, y_pred, sigma_pred
    Output: Sensitiviey of input: a function that computers derivate (x-axis),
likelihood, and sigma (radius of the bubble). x,y,r =
    sensititivyOfInput(x_pred,y_pred,sigma_red,optimalPoint)
    Activity1: set optimalPoint = 5 ### For example
```

-continued

```
Activity2: ### Bubble x axis
    if optimalInput==inputrange[0]:
        derivative = (outputrange[1] – outputrange[0])
    if optimalInput ==inputrange[-1]:
        derivative = (outputrange[-1] – inputrange[-2])
    else:
        derivative = outputrange[optimalInput] –
    outputrange[optimalInput-1]
Activity3: ## Bubble y axis
    input_dist = stats.norm(ASSUMED_INPUT_MEAN,
ASSUMED_INPUT_SD)
    y_0 = input_dist.cdf(optimalInput)
    y_1 = input_dist.cdf(optimalInput + 1)
    pdfVAL = y_1 – y_0
Activity4: ### Bubble radius
    radius = sum(input_sigma)/len(input_sigma)
Activity5: Return derivative, pdfVal, radius as output
```

According to embodiments, risk management visualization system 110 may use the pseudocode provided above as a method of generating the degree of influence visualization according to an embodiment. The pseudocode for generating the degree of influence visualization illustrates implementing a particular embodiment of the method by one or more actions, which although described in a particular order, may be performed in one or more permutations, as disclosed above, according to particular needs.

Feasible Input Range:

The feasible input range is the values, or range of values, for which the KPI value is within the risk profile. Risk management visualization system 110 calculates the feasible range of input from the confidence intervals of the predicted KPI values of the input variables and the range selected for the risk profile. One or more dashboard visualizations, including but not limited to one or more risk management dashboards 900, may illustrates the feasible range as bars (which may, in an embodiment, be colored orange, red, or any other color). The bars indicate for each of the four KPIs (Transit inv. Cost, Transport Cost, Overhead Cost, and Network Profit) the range of feasible input values. The feasible range may be a continuous range or multiple ranges.

In an embodiment illustrated by FIGS. 9A-9B, the star displayed by input recommendation visualizations 914a-914d may indicate the optimal input value. The optimal input value is the value of the input variable for which the KPI will be at the maximum (for KPIs representing objectives to be maximized, such as, for example, network profit) or be at the minimum (for KPIs representing objectives to be minimized, such as, for example, cost).

Risk management visualization system 110 determines a common range from the intersection of all four ranges, within which the KPI values do not deteriorate. When none of the ranges overlap, risk management visualization system 110 determines that no input value will show improvement for all of the KPIs. According to one embodiment, risk management visualization system 110 selects the input value based on previous calculations of the input value, business knowledge, and/or retains the current value. Selecting a different input value may result in some sub-optimal KPI values. Based on the feasible range and optimal value of the input variables, risk management visualization system 110 identifies the risk for the selected KPIs given the input variability, the feasible range of inputs that maintains the desired risk profile, and the sensitivity of KPIs to changes in input variable values.

FIG. 16 illustrates method 1600 for calculating the feasible input range, according to an embodiment. Method

1600 proceeds by one or more actions, which although described in a particular order, may be performed in one or more permutations, according to particular needs.

At action 1602, risk management visualization system 110 receives the feasible range inputs comprising the predicted KPI values, $\sigma$ of the predicted KPI values, the values of the input variables, and the selected risk range (lower bound of the range to the upper bound of the range) and the predicted KPI confidence interval. At action 1604, risk management visualization system 110 calculates the KPI lower bound of the risk range as the base KPI*(1–lower risk range %/100) and calculates the KPI upper bound of the risk range as the base KPI*(1–upper risk range %/100).

At action 1606, risk management visualization system 110, for each mean and standard deviation of the predicted KPI values, calculates the lower bound and upper bound by:

when the $\sigma$ is not zero, the lower bound and the upper bound are equal to the Gaussian interval with given mean, $\sigma$ and confidence interval; and when the $\sigma$ is zero, the lower bound and the upper bound are equal to the mean, the lower bound is equal to the KPI lower bound, the upper bound is equal to the KPI upper bound.

At action 1608, risk management visualization system 110 calculates the matched intervals of the upper and lower bounds. According to embodiments, the matched upper bounds are all indices where all indices where KPI_ub_list>=KPI_lb, and the matched lower bounds are all indices where KPI_lb_list<=KPI_ub. At action 1610, risk management visualization system 110 calculates the feasible range indices as each feasible range index comprising an intersection of the matched upper bounds the matched lower bounds. At action 1612, risk management visualization system determines a feasible range of input. At action 1614, risk management visualization system 110 generates the feasible range of the inputs based on the feasible values indices wherein the feasible range is equal to the input values present at the indices of feasible range index. Risk management visualization system 110 generates the feasible range visualization at action 1616, and method 1600 ends.

Risk management visualization system 110 determines a common range from the intersection of all four ranges, within which the KPI values do not deteriorate. Based on the feasible range and optimal value of the input variables, risk management visualization system 110 identifies the risk for the selected KPIs given the input variability, the feasible range of inputs that maintains the desired risk profile, and the sensitivity of KPIs to changes in input variable values.

```
Input: x_pred, y_pred, sigma_pred, confidence interval (ci), kpi_lb, kpi_ub
Output: input feasible range
Activity1: Initialize kpi_lb_list = [ ], kpi_ub_list = [ ]
    for mu, sigma in zip(y_pred, sigma_pred):
        if(sigma != 0):
            kpi_lb_tmp, kpi_ub_tmp = stats.norm.interval(ci/100., mu,
        sigma)
        else:
            kpi_lb_tmp, kpi_ub_tmp = mu, mu
        kpi_lb_list.append(kpi_lb_tmp)
        kpi_ub_list.append(kpi_ub_tmp)
        kpi_lb_list = np.array(kpi_lb_list)
        kpi_ub_list = np.array(kpi_ub_list)
Activity2: ub_matched = np.where(kpi_ub_list >= kpi_lb)[0].tolist( )
    lb_matched = np.where(kpi_lb_list <= kpi_ub)[0].tolist( )
Activity3: feasible_range_index = list(set(ub_matched).intersection(lb_
matched))
Activity4: feasible_range = list(np.array(x_pred)[feasible_range_index])
Activity5: Return feasible range
```

According to embodiments, risk management visualization system 110 may use the pseudocode provided above as a method of calculating the feasible input range, according to an embodiment. The pseudocode for calculating the feasible input range illustrates implementing a particular embodiment of the method by one or more actions, which although described in a particular order, may be performed in one or more permutations, as disclosed above, according to particular needs.

Figure 17:
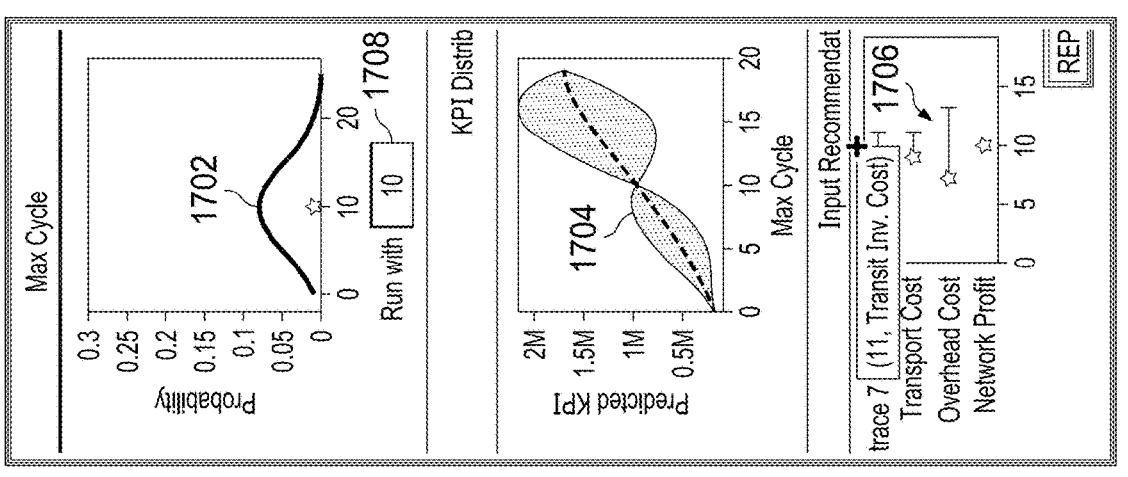
FIG. 17 illustrates input distribution, predicted KPI values based on the variability and confidence interval for each of the inputs, and a feasible and optimal range of input values visualization for the Max Cycle input, according to an embodiment.

FIG. 17 illustrates input distribution 1702, predicted KPI values 1704 based on the variability and confidence interval for each of the inputs, and feasible and optimal range of input values visualization 1706 for the Max Cycle input, according to an embodiment. In this example, the Max Cycle input is set to ten as shown by the value displayed in variable input value entry box 1708. As indicated by feasible range and optimal input values visualization 1706, the value of ten is not only the optimal value (indicated by the star icon) to maximize the network profit KPI, but is the only value of Max Cycle that is feasible (indicated by the lack of a feasible input range slider for the network profit KPI). In response to determining the variable input (Max Cycle) having the greatest influence on the network profit KPI should not be changed, risk management visualization system 110 and/or a supply chain planner may modify the variable input having the second greatest influence on the network profit KPI, which, as indicated above, is the Fixed Cost input. Similar to the Max Cycle input value, risk management visualization system 110 provides an interactive element of the GUI to receive an input to modify the variable input value for Fixed Cost. For example, the dashboard of the current example comprises the input value entry box for Fixed Cost, which displays the initial value that was calculated to provide the maximal network profit within the risk range.

Figure 18:
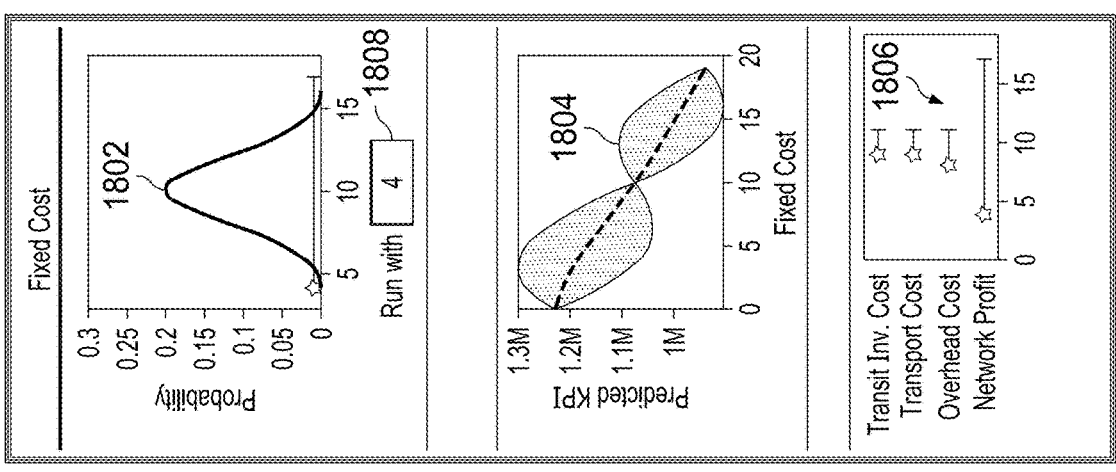
FIG. 18 illustrates input distribution, predicted KPI values based on the variability and confidence interval for each of the inputs, and a feasible and optimal range of input values visualization for the Fixed Cost input variable, according to an embodiment.

FIG. 18 illustrates input distribution 1802, predicted KPI values 1804 based on the variability and confidence interval for each of the inputs, and feasible and optimal range of input values visualization 1806 for the Fixed Cost input variable, according to an embodiment. In this example, Fixed Cost input 1808 is set to four as shown by the value displayed in the input value entry box. As indicated by feasible range and optimal input values visualization 1806, the value of four is the optimal value (indicated by the star icon) to maximize the network profit KPI; however, the feasible input range slider for the network profit KPI indicates that the value of Fixed Cost may be set to any value between four and seventeen, inclusive.

Although setting Fixed Cost input 1808 value to four may maximize the network profit, the value of four is not feasible for the other KPIs. The feasible values for the other KPIs range from eight to eleven for the overhead cost KPI, or from nine to eleven for the Transit inv. Cost KPI and Transport Cost KPI. This indicates that Fixed Cost input 1808 is feasible only between nine and eleven, inclusive, for all KPIs. Although the value may be set to any value from nine to eleven, the optimal value for the Transit inv. Cost KPI and Transport Cost KPI is nine, which, in this case is the value of the Fixed Cost Input that is entered into the input value entry box.

Figure 19:
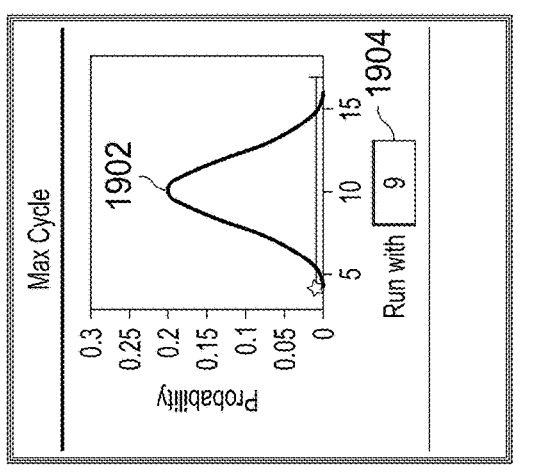
FIG. 19 illustrates input variability for the Fixed Cost input and the network profit KPI, according to an embodiment.

FIG. 19 illustrates input variability 1902 for the Fixed Cost input and the network profit KPI, according to an embodiment. In response to the modifying Fixed Cost input 1904 from 10 to 9, as disclosed above, and the REPLAN button is selected, risk management visualization system 110 calculates the updated risk profile and displays the visualizations of the dashboard to indicate the changes to the risk profile, including, for example, changes to the values of the KPIs and the display of the KPI risk chart.

Figure 20:
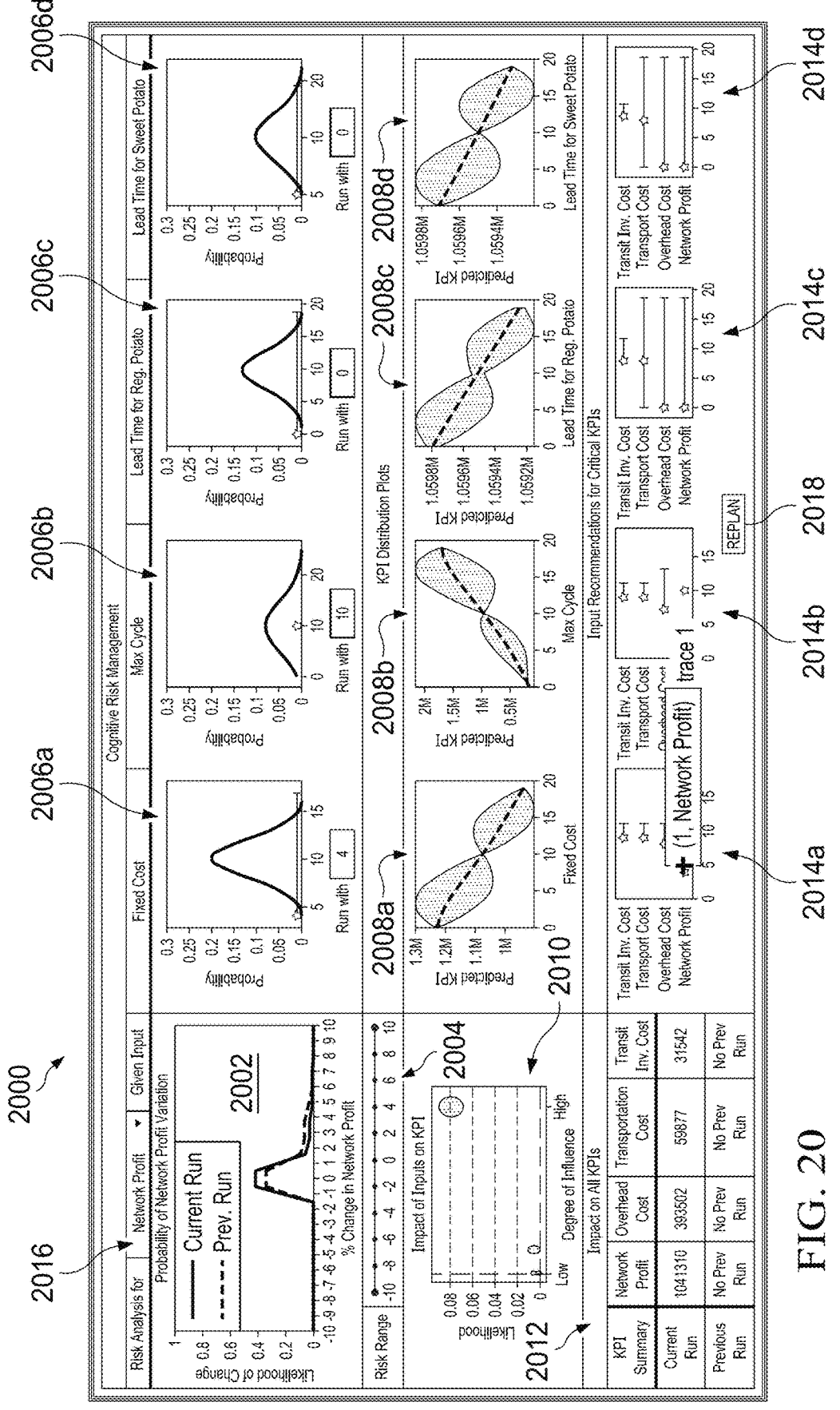
FIG. 20 illustrates the risk management dashboard after calculating and displaying the risk profile for the modified Fixed Cost value, value, according to an embodiment.

FIG. 20 illustrates risk management dashboard 2000 after calculating and displaying the risk profile for the modified Fixed Cost value, value, according to an embodiment. In one embodiment, risk management dashboard 2000 comprises KPI risk chart 2002, risk range selector 2004, input distribution charts 2006a-2006d, KPI distribution charts 2008a-2008d, input impact visualization 2010, KPI impact visualization 2012, input recommendation visualizations 2014a-2014d, risk analysis selector 2016, and replan button 2018. Comparing risk management dashboard 2000 with the dashboard prior to the replan, risk management visualization system 110 has updated KPI risk chart 2002 and the predicted KPI value chart to show risk and predicted KPIs for the previous run as well as the replan. In addition, the input distribution, the predicted KPI variability and confidence charts, and the optimal values of the inputs and the range of feasible inputs are updated to reflect the newly selected input value.

Reference in the foregoing specification to "one embodiment", "an embodiment", or "some embodiments" means that a particular feature, structure, or characteristic described in connection with the embodiment is included in at least one embodiment of the invention. The appearances of the phrase "in one embodiment" in various places in the specification are not necessarily all referring to the same embodiment.

While the exemplary embodiments have been shown and described, it will be understood that various changes and modifications to the foregoing embodiments may become apparent to those skilled in the art without departing from the spirit and scope of the present invention.

What is claimed is:

1. A system for generating an interval list and probability list based on an input variable, comprising:
a system architecture comprising a UI layer, a backend layer, a solvers layer and at least one server;
the at least one server, each comprising a processor and memory, is configured to:
receive, by the UI layer, one or more inputs for a risk profile;
calculate a uniform interval range by dividing a length between a lower range value and an upper range value into equal intervals;
generate a probability list based, at least in part, on a list of the equal intervals;
calculate a probability of each input value of the input variable;
determine, using the backend layer, a state of one or more solvers in the solvers layer using one or more data update and retrieval APIs;
communicate with the one or more solvers in the solvers layer to calculate a KPI for each interval, wherein results from the solvers layer are communicated in JavaScript Object Notation;
set a total return probability at zero;
for each input value calculate, by the one or more solvers in the solvers layer, a probability of an observed KPI;
calculate the total return probability;
generate a probability of the KPI at each interval; and
display on a dashboard, by the UI layer using one or more python script modules, one or more visualizations based, at least in part on the generated KPI probabilities.

2. The risk management visualization system of claim 1, wherein the one or more risk profile inputs comprise one or more of: an input range for the input variable, a corresponding predicted KPI, a predicted standard deviation, a base KPI, a risk range using a lower range value and an upper range value, and a quantity of intervals.

3. The risk management visualization of claim 1, wherein the probability of the KPI at each interval is determined by dividing the total return probability by a sum of input probabilities.

4. The risk management visualization system of claim 1, wherein the probability of each input value of the input variable is determined using a Gaussian probability density function.

5. The risk management visualization system of claim 1, wherein the at least one server is further configured to:

calculate the probability of the observed KPI as a cumulative distribution function value of the observed KPI.

6. The risk management visualization system of claim 1, wherein the at least one server is further configured to:

retrieve, by the UI layer, a name of the KPI and a name of the input variable.

7. The risk management visualization system of claim 1, wherein the kernel comprises a sum of kernels.

8. A computer implemented method for generating an interval list and probability list based on an input variable, comprising:

receiving, by a UI layer of at least one server, one or more inputs for a risk profile, wherein the at last one server each comprise a processor and memory;

calculating, by the at least one server, a uniform interval range by dividing a length between a lower range value and an upper range value into equal intervals;

generating, by the at least one server, a probability list based, at least in part, on a list of the equal intervals;

calculating, by the at least one server, a probability of each input value of the input variable;

determining, using a backend layer of the at least one server, a state of one or more solvers in a solvers layer using one or more data update and retrieval APIs;

communicating, by the at least one server, with the one or more solvers in the solvers layer to calculate a KPI for each interval, wherein results from the solvers layer are communicated in JavaScript Object Notation;

setting, by the at least one server, a total return probability at zero;

for each input value calculating, by the one or more solvers in the solvers layer, a probability of an observed KPI;

calculating, by the at least one server, the total return probability;

generating, by the at least one server, a probability of the KPI at each interval; and displaying, by the at least one server, on a dashboard, by the UI layer using one or more python script modules, one or more visualizations based, at least in part on the generated KPI probabilities.

9. The computer-implemented method of claim 8, wherein the one or more risk profile inputs comprise one or more of: an input range for the input variable, a corresponding predicted KPI, a predicted standard deviation, a base KPI, a risk range using a lower range value and an upper range value, and a quantity of intervals.

10. The computer-implemented method of claim 8, wherein the probability of the KPI at each interval is determined by dividing the total return probability by a sum of input probabilities.

11. The computer-implemented method of claim 8, wherein the probability of each input value of the input variable is determined using a Gaussian probability density function.

12. The computer-implemented method of claim 8, further comprising:

calculating, by the at least one server, the probability of the observed KPI as a cumulative distribution function value of the observed KPI.

13. The computer-implemented method of claim 8, further comprising:

retrieving, by the UI layer, a name of the KPI and a name of the input variable.

14. The computer-implemented method of claim 8, wherein the kernel comprises a sum of kernels.

15. A non-transitory computer-readable medium embodied with software for generating an interval list and probability list based on an input variable, the software when executed by at least one server, the at least one server comprising a processor and memory:

receives, by a UI layer of at least one server, one or more inputs for a risk profile, wherein the at last one server each comprise a processor and memory;

calculates a uniform interval range by dividing a length between a lower range value and an upper range value into equal intervals;

generates a probability list based, at least in part, on a list of the equal intervals;

calculates a probability of each input value of the input variable;

determines, using a backend layer, a state of one or more solvers in a solvers layer using one or more data update and retrieval APIs;

communicates with the one or more solvers in the solvers layer to calculate a KPI for each interval, wherein results from the solvers layer are communicated in JavaScript Object Notation;

sets a total return probability at zero;

for each input value calculates, by the one or more solvers in the solvers layer, a probability of an observed KPI;

calculates the total return probability;

generates a probability of the KPI at each interval; and displays on a dashboard, by the UI layer using one or more python script modules, one or more visualizations based, at least in part on the generated KPI probabilities.

16. The non-transitory computer-readable medium of claim 15, wherein the one or more risk profile inputs comprise one or more of: an input range for the input variable, a corresponding predicted KPI, a predicted standard deviation, a base KPI, a risk range using a lower range value and an upper range value, and a quantity of intervals.

17. The non-transitory computer-readable medium of claim 15, wherein the probability of the KPI at each interval is determined by dividing the total return probability by a sum of input probabilities.

18. The non-transitory computer-readable medium of claim 15, wherein the probability of each input value of the input variable is determined using a Gaussian probability density function.

19. The non-transitory computer-readable medium of claim 15, wherein the software when executed further:

calculates the probability of the observed KPI as a cumulative distribution function value of the observed KPI.

20. The non-transitory computer-readable medium of claim 15, wherein the software when executed further:

retrieves, by the UI layer, a name of the KPI and a name of the input variable.

\* \* \* \* \*